(12) United States Patent
Iwai et al.

(10) Patent No.: US 8,330,879 B2
(45) Date of Patent: Dec. 11, 2012

(54) PROJECTION DISPLAY APPARATUS

(75) Inventors: Junichi Iwai, Kanagawa (JP); Hideki Yamamoto, Kanagawa (JP); Yuji Manabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 501 days.

(21) Appl. No.: 12/693,802

(22) Filed: Jan. 26, 2010

(65) Prior Publication Data

US 2010/0195006 A1     Aug. 5, 2010

(30) Foreign Application Priority Data

Feb. 2, 2009  (JP) ................................ P2009-021564

(51) Int. Cl.
*G02F 1/1335*     (2006.01)
(52) U.S. Cl. .................................. 349/9; 349/5; 353/20
(58) Field of Classification Search .................. None
See application file for complete search history.

(56) References Cited

U.S. PATENT DOCUMENTS 5,042,921 A * 8/1991 Sato et al. .......................... 349/9
6,331,060 B1 * 12/2001 Yamamoto et al. ............. 353/31

FOREIGN PATENT DOCUMENTS

| JP | 8 271855 | 10/1996 |
| JP | 3470491 | 9/2003 |

* cited by examiner

*Primary Examiner* — Lucy Chien
(74) *Attorney, Agent, or Firm* — Frommer Lawrence & Haug LLP; William S. Frommer

(57) ABSTRACT

A projection display apparatus includes a light source configured to emit light, at least one reflective liquid crystal device configured to generate an image by modulating a polarization of the light emitted from the light source and reflecting the light, an imaging lens configured to form a real image of the image generated by the reflective liquid crystal device, a quarter-wave plate disposed between the reflective liquid crystal device and the imaging lens, an image splitter configured to include at least one reflecting plane and spatially split the real image into at least two split real images by reflecting the real image on the reflecting plane, at least two projection lenses configured to form the split real images again on a screen, and a phase difference corrector configured to correct a phase difference between a p-polarized light and an s-polarized light generated by the reflecting plane.

9 Claims, 15 Drawing Sheets

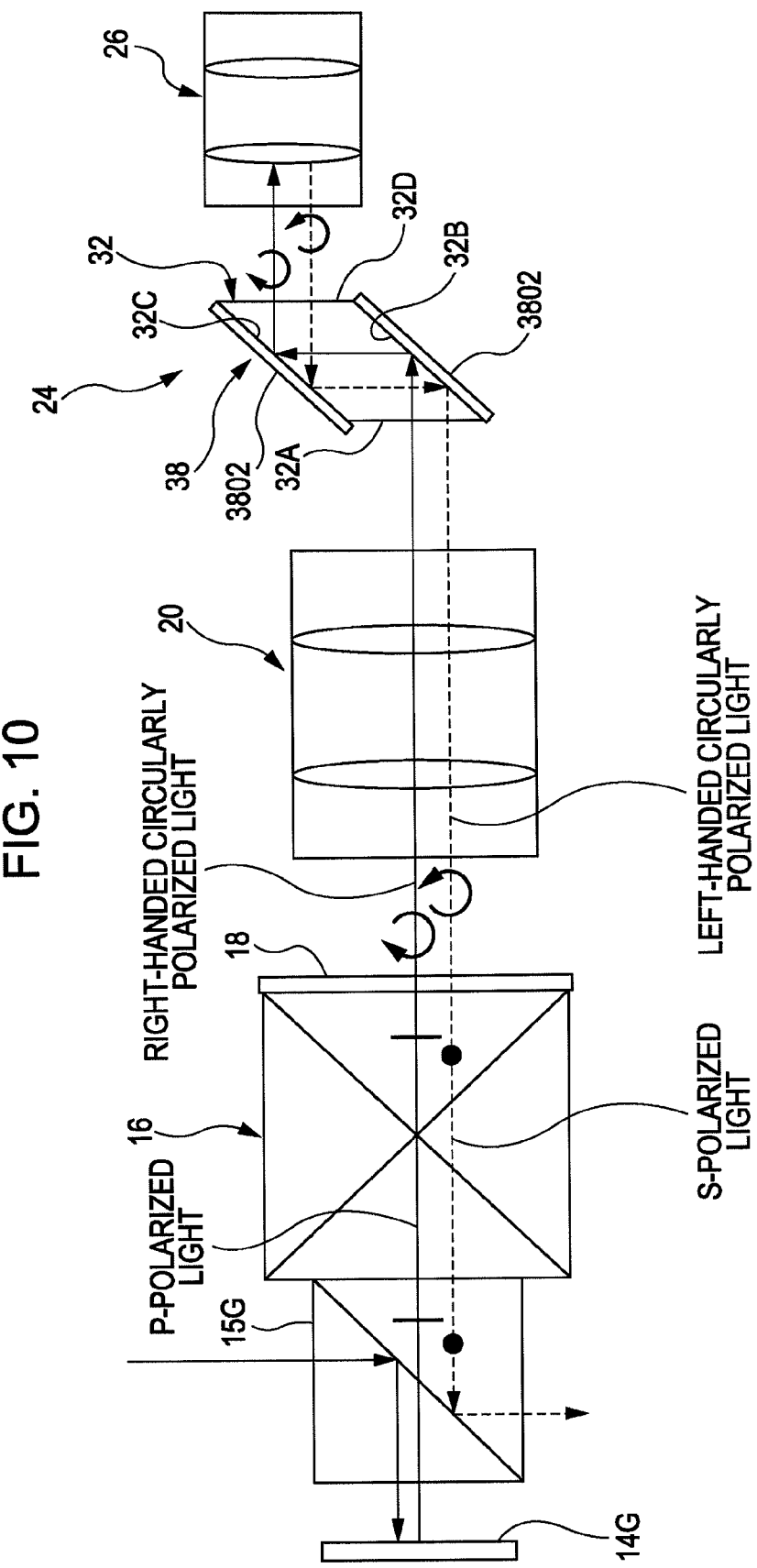

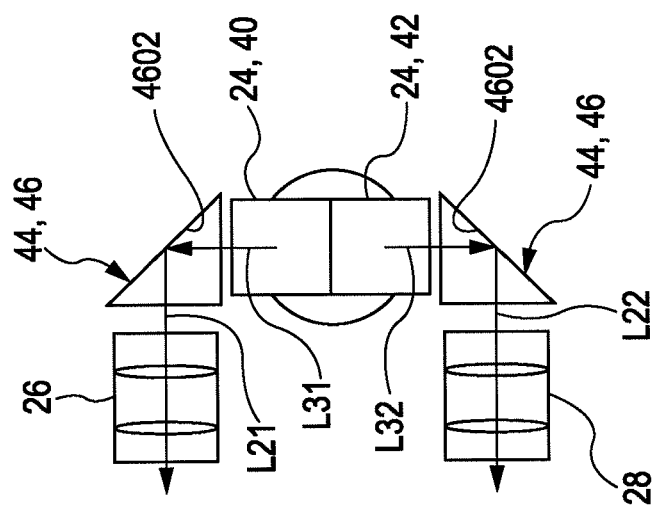
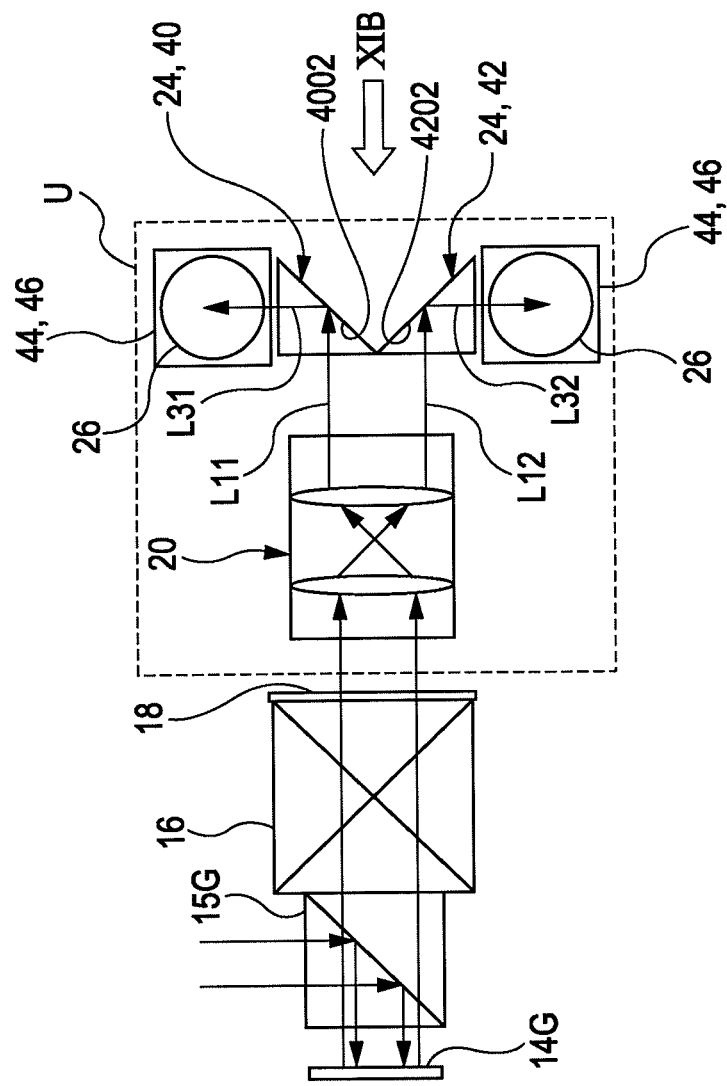
FIG. 11B
FIG. 11A

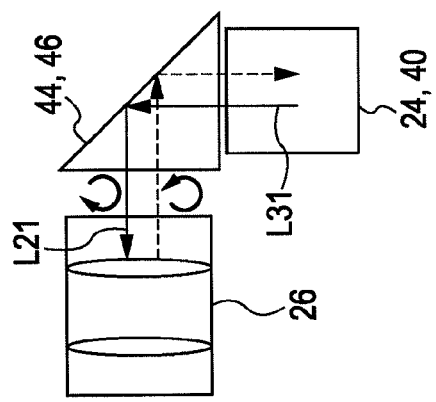
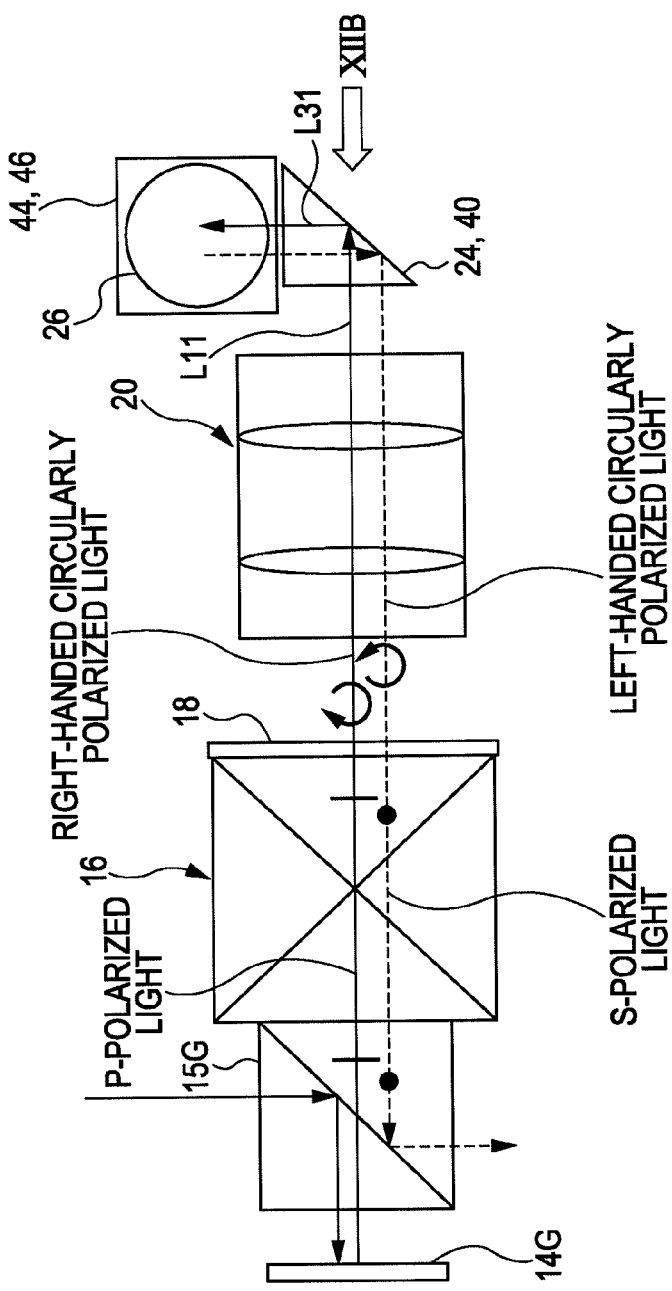
FIG. 12A
FIG. 12B

PROJECTION DISPLAY APPARATUS

BACKGROUND OF THE INVENTION

1. Field of the Invention

The present invention relates to a projection display apparatus, specifically to a liquid crystal projector that projects an image modulated through a liquid crystal panel on a screen, and more specifically to a projection display apparatus that projects a three-dimensional (3D) image using reflective liquid crystal devices.

2. Description of the Related Art

With recent digitalization of cinema contents, a digital projector has been attracting more attention as a movie player. Among digital projectors, a reflective liquid crystal projector using reflective liquid crystal devices is spotlighted because it is especially suitable for a cinema because of its capability of providing a smooth high-resolution image.

To realize a high-quality projection image, occurrence of a ghost image in an optical system of the projector should be reduced.

Especially in a case of the reflective type, there is a possibility that light emitted from a lamp is, for example, reflected on a surface of each projection lens, returns to a surface of the reflective liquid crystal device, and is reflected on a screen again forming a ghost image, which degrades the image quality.

Japanese Unexamined Patent Application Publication No. 08-271855 and Japanese Patent No. 3470491 disclose technologies of preventing occurrence of such a ghost image.

Both of the above patent documents disclose a technology of suppressing the occurrence of the ghost image by arranging a quarter-wave plate with an orientation of an optical axis set to either 45 degrees or 135 degrees immediately in front of the projection lens. A mechanism of this technology is explained below.

FIG. 13 shows the basic configuration of a general 3-chip CCD reflective liquid crystal projector.

Light emitted from a lamp LM enters dichroic mirrors 1 and 2 arranged to cross each other via a reflector RE and a polarization converting uniformly illuminating optical system IL.

Two of three primary colors, for example, red (R) and green (G), are directed to a dichroic mirror 3 via a mirror M1, and they are further split into two colors of such as R and G to enter illumination lenses L1 and L2.

The remaining color, such as blue (B), enters an illumination lens L3 via a mirror M2.

Each colored light then passes through a corresponding one of polarization beam splitters PBS1, PBS2, and PBS3 and reflective liquid crystal devices D1, D2, and D3 to be synthesized by a color composition prism PR, enters a projection lens LN (LN1 and LN2), and is projected on a screen S.

Next, a behavior of the light reflected on the surface of each lens of the projection lens LN is shown in FIG. 14.

For simplification, FIG. 14 shows only part of the optical system shown in FIG. 13.

The light from the lamp LM proceeds in the optical system as indicated by the solid arrows.

Because the light reflected by the reflective liquid crystal device D2 passes through the polarization beam splitter PBS2, it enters the projection lens LN via the color composition prism PR in a state of a p-polarized light (an electric field is vibrating in a plane parallel to the paper plane). It is because the polarization beam splitter generally has a nature of transmitting p-polarized light.

The light reflected by the projection lens LN1 (p-polarized light) schematically proceeds as indicated by the dashed arrows, and returns to the surface of the reflective liquid crystal device D2. The light is then reflected on the surface of the reflective liquid crystal device D2 again toward the projection lens LN, and reaches the screen S and appears as the ghost image.

Therefore, to remove the ghost image, a quarter-wave plate WP with the orientation of the optical axis set to either 45 degrees or 135 degrees (zero degree is parallel to the paper plane) was arranged on an output plane of the color composition prism PR as shown in FIG. 15, in the past.

In this manner, the light output from the quarter-wave plate WP is directed to the projection lens LN, for example, in a right-handed circularly polarized state, then left-handed circularly polarized by a mirror reversal when the light is reflected by the projection lens LN, and returns to pass through the quarter-wave plate WP again.

As a result, the light is s-polarized (the electric field is vibrating in a plane perpendicular to the paper plane) in the color composition prism PR, and enters the polarization beam splitter PBS2.

Because the polarization beam splitter PBS2 has a nature of reflecting an s-polarized light, the light is reflected by the polarization beam splitter PBS2, and wasted without returning to the surface of the reflective liquid crystal device D2. In this manner, the ghost image can be removed.

SUMMARY OF THE INVENTION

There is an increasing demand for a three-dimensional (3D) cinema contents in addition to two-dimensional (2D) cinema contents desired in the past. Therefore, a reflective liquid crystal projector capable of showing a high-quality 3D cinema is desired.

Unlike the reflective liquid crystal projector in the past described above, the reflective liquid crystal projector capable of showing the 3D cinema is configured to split an image into two or more images. Therefore, it is difficult to remove the ghost image by applying the related technology as it is due to restriction on the configuration of the optical system.

It is desirable to provide a projection display apparatus advantageous in improving image quality by efficiently preventing occurrence of a ghost image in a configuration to split an image into two or more images and project them.

A projection display apparatus according to an embodiment of the present invention includes a light source configured to emit light, at least one reflective liquid crystal device configured to generate an image by modulating a polarization of the light emitted from the light source and reflecting the light, an imaging lens configured to form a real image of the image generated by the reflective liquid crystal device, a quarter-wave plate disposed between the reflective liquid crystal device and the imaging lens, a means for splitting image configured to include at least one reflecting plane and spatially split the real image into at least two split real images by reflecting the real image on the reflecting plane, at least two projection lenses configured to form the split real images again on a screen, and a means for correcting phase difference configured to correct a phase difference between a p-polarized light and an s-polarized light generated by the reflecting plane.

According to an embodiment of the present invention, because a means for correcting phase difference is provided to remove light reflected from a projection lens and the like disposed behind a means for splitting image so that the light does not reach a reflective liquid crystal device, occurrence of a ghost image can be prevented, and it is advantageous in improving image quality.

BRIEF DESCRIPTION OF THE DRAWINGS

FIG. 10 illustrates removal of the ghost image by the phase difference corrector according to the still other embodiment;

FIG. 11A shows a projection display apparatus according to yet another embodiment of the present invention with a part thereof omitted;

FIG. 11B shows the projection display apparatus shown in FIG. 11A as seen from a direction indicated by an arrow XIB;

FIG. 12A illustrates removal of the ghost image by the phase difference corrector according to the yet other embodiment;

FIG. 12B illustrates the removal of the ghost image shown in FIG. 12A as seen from a direction indicated by an arrow XIIB;

DESCRIPTION OF THE PREFERRED EMBODIMENTS

Embodiment

Figure 1:
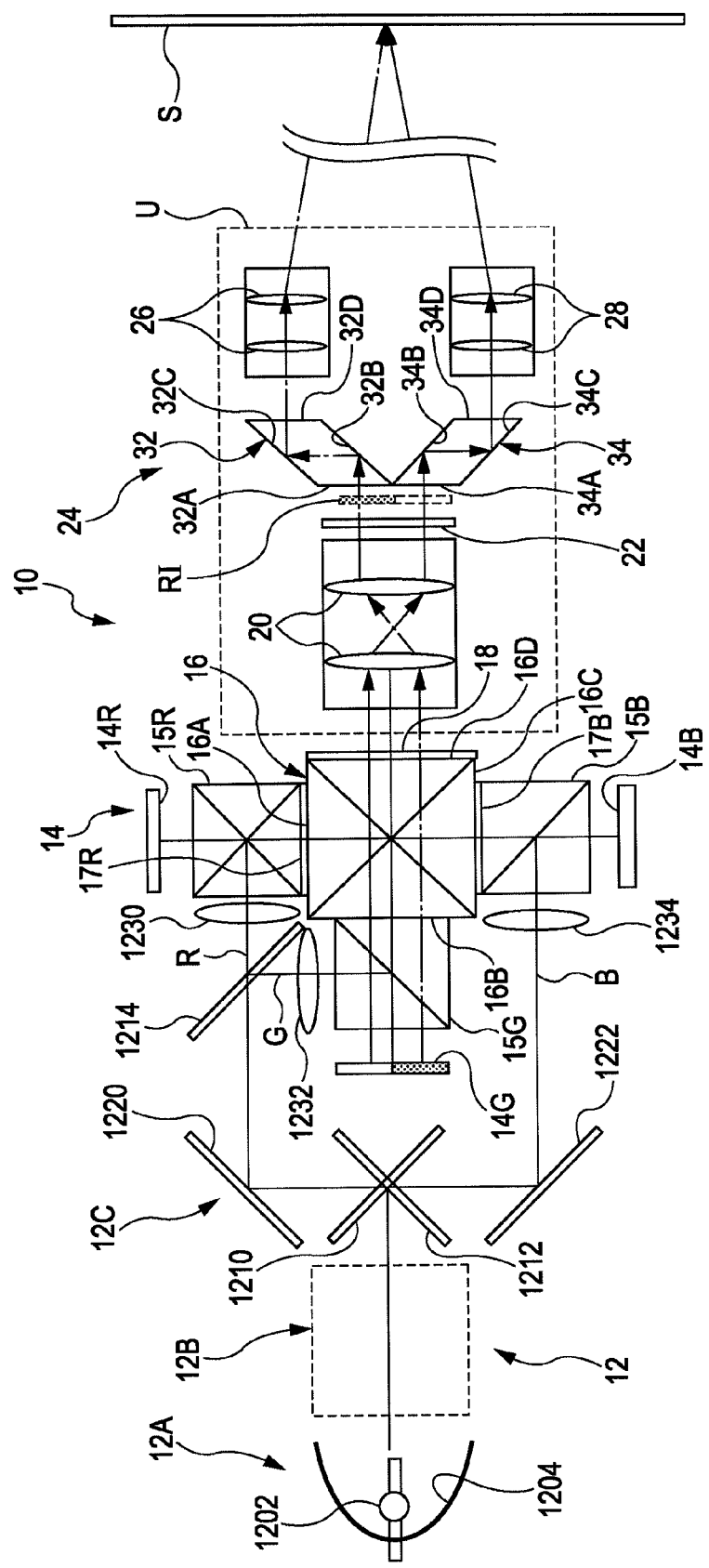
FIG. 1 shows a projection display apparatus according to an embodiment of the present invention.

Next, an embodiment of the present invention will be described with reference to FIGS. 1 to 6.

First, the overall configuration of a projection display apparatus 10 is described with reference to FIG. 1.

According to the embodiment, the projection display apparatus 10 projects a three-dimensional (3D) image on a screen S.

The projection display apparatus 10 includes an illuminating unit 12, an image forming unit 14, an image synthesizing unit 16, a quarter-wave plate 18, an imaging lens 20, a phase difference corrector 22, an image splitter 24, a first projection lens 26, a second projection lens 28.
(Illuminating Unit 12)

The illuminating unit 12 directs three light beams with different wavelengths to the image forming unit 14.

According to the embodiment, the illuminating unit 12 includes a light source 12A, an illuminating optical unit 12B, and a splitting unit 12C.

The light source 12A includes a lamp 1202 that outputs a white light and a reflector 1204.

The lamp 1202 can be a high-pressure mercury lamp that emits the white light or any lamp disclosed in the past.

The illuminating optical unit 12B forms a polarization converting uniformly illuminating optical system, and directs the white light emitted from the light source 12A to the splitting unit 12C after making the light parallel and placing it into a predetermined polarization state.

The illuminating optical unit 12B includes an ultraviolet-infrared cut filter, a fly-eye lens, a PS converter, a condenser lens arranged in front of the light source 12A, and it is configured so that the white light emitted from the light source 12A passes through them to become a parallel light in the predetermined polarization state (s-polarized) and enter the splitting unit 12C.

The splitting unit 12C splits the light directed from the illuminating optical unit 12B (white light) into three light beams with different wavelengths, i.e., a red light R, a green light G, and a blue light B, and directs them to the image forming unit 14.

According to the embodiment, the splitting unit 12C includes a first dichroic mirror 1210, a second dichroic mirror 1212, a third dichroic mirror 1214, a first reflecting mirror 1220, a second reflecting mirror 1222, a first illuminating lens 1230, a second illuminating lens 1232, and a third illuminating lens 1234.

Specifically, the light directed from the illuminating optical unit 12B enters the first and second dichroic mirrors 1210 and 1212 arranged to cross each other at an angle of 90 degrees.

The red light R and the green light G split by the first and second dichroic mirrors 1210 and 1212 enter the third dichroic mirror 1214 via the first reflecting mirror 1220.

The red light R having passed through the third dichroic mirror 1214 enters the first illuminating lens 1230.

The green light G reflected by the third dichroic mirror 1214 enters the second illuminating lens 1232.

The blue light B split by the first and second dichroic mirrors 1210 and 1212 enters the third illuminating lens 1234 via the second reflecting mirror 1222.

It should be appreciated that the configuration of the splitting unit 12C is not limited to the above, and any configuration based on the related art can be employed.
(Image Forming Unit 14)

The image forming unit 14 forms three images with different wavelengths for a left eye and three images with different wavelengths for a right eye by modulating the three light beams R, G, and B with different wavelengths using a reflective liquid crystal device as a spatial modulator.

According to the embodiment, the image forming unit 14 includes a first reflective liquid crystal device 14R, a second reflective liquid crystal device 14G, a third reflective liquid crystal device 14B, a first polarization beam splitter 15R, a second polarization beam splitter 15G, and a third polarization beam splitter 15B.

The first to third reflective liquid crystal devices 14R, 14G, and 14B respectively display image information in red, green, and blue. An image signal of a color corresponding to the incident light is applied, and the first to third reflective liquid crystal devices 14R, 14G, and 14B output the light modulated by converting the polarizing direction of the incident light by 90 degrees according to the image signal. Specifically, the s-polarized incident light is reflected as the p-polarized reflected light.

In other words, the first to third reflective liquid crystal devices 14R, 14G, and 14B generate an image by modulating the polarization of the light emitted from the light source 12A and reflecting the modulated light.

Figure 2:
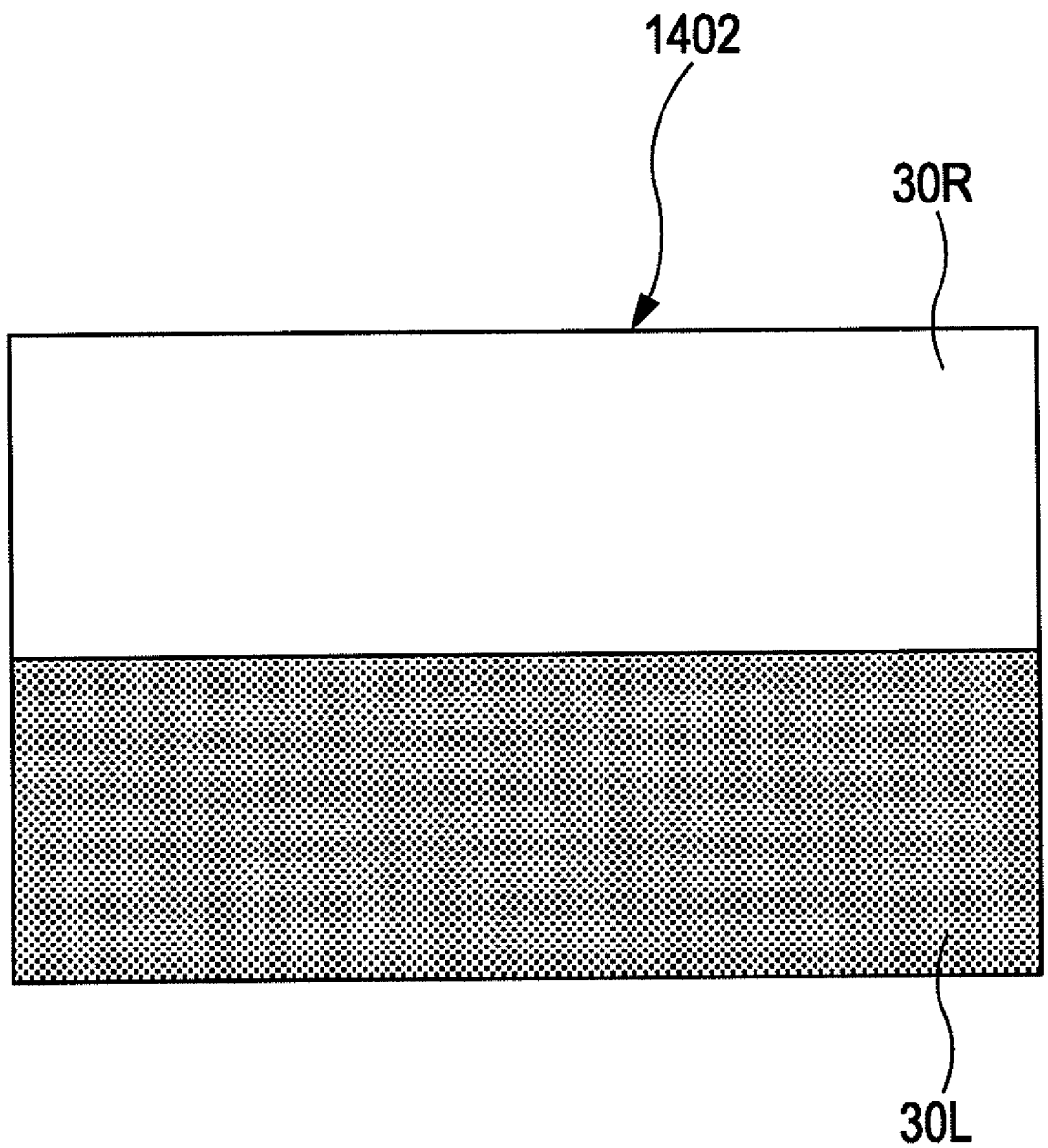
FIG. 2 is a schematic for explaining a display panel of each of reflective liquid crystal devices.

FIG. 2 is a schematic for explaining a display panel 1402 of each of the reflective liquid crystal devices 14R, 14G, and 14B.

Each of the reflective liquid crystal devices 14R, 14G, and 14B includes the rectangular display panel 1402 with the same size and shape.

According to the embodiment, the display panel 1402 is divided vertically into a top and a bottom at the center in the longitudinal direction so as to form an image area for the left eye 30L and an image area for the right eye 30R.

In this case, each of the image area for the left eye 30L and the image area for the right eye 30R is a horizontally long rectangular with the same size and shape.

The first to third polarization beam splitters 15R, 15G, and 15B reflect an s-polarized light and transmit a p-polarized light.

The first polarization beam splitter 15R reflects the s-polarized light R to let it enter the first reflective liquid crystal device 14R, and transmits the p-polarized light R spatially modulated by the first reflective liquid crystal device 14R to let it enter the image synthesizing unit 16.

In short, the first polarization beam splitter 15R lets the images with different wavelengths for the left eye and the right eye based on the red light R enter the image synthesizing unit 16.

The second polarization beam splitter 15G reflects the s-polarized light G to let it enter the second reflective liquid crystal device 14G, and transmits the p-polarized light G spatially modulated by the second reflective liquid crystal device 14G to let it enter the image synthesizing unit 16.

In short, the second polarization beam splitter 15G lets the images with different wavelengths for the left eye and the right eye based on the green light G enter the image synthesizing unit 16.

The third polarization beam splitter 15B reflects the s-polarized light B to let it enter the third reflective liquid crystal device 14B, and transmits the p-polarized light B spatially modulated by the third reflective liquid crystal device 14B to let it enter the image synthesizing unit 16.

In short, the third polarization beam splitter 15B lets the images with different wavelengths for the left eye and the right eye based on the blue light B enter the image synthesizing unit 16.

(Image Synthesizing Unit 16)

The image synthesizing unit 16 synthesizes the three images with different wavelengths for the left eye into a single image for the left eye, and synthesizes the three images with different wavelengths for the right eye into a single image for the right eye.

That is, the image synthesizing unit 16 synthesizes color light modulated by the first to third reflective liquid crystal devices 14R, 14G, and 14B and then transmitted by the first to third polarization beam splitter 15R, 15G, and 15B.

According to the embodiment, a color composition prism is used as the image synthesizing unit 16.

The image synthesizing unit 16 includes a first incident plane 16A, a second incident plane 16B, and a third incident plane 16C to which p-polarized colored light transmitted by the first to third polarization beam splitters 15R, 15G, and 15B are directed, and an output plane 16D that outputs a synthesized image.

In addition to the color composition prism, various optical materials based on the related art can be employed as the image synthesizing unit 16.

A half-wave plate 17B with the orientation of the optical axis set to either 45 degrees or 135 degrees is provided between the polarization beam splitter 15B and the incident plane 16C of the image synthesizing unit.

In the same manner, a half-wave plate 17R with the orientation of the optical axis set to either 45 degrees or 135 degrees is provided between the polarization beam splitter 15R and the incident plane 16A of the image synthesizing unit.

As a result, the polarization of the light B and the light R has been converted from p-polarization to s-polarization before entering the image synthesizing unit 16. The polarization is converted because the color composition prism has a nature of reflecting the s-polarized light more efficiently in the light B and the light R and transmitting the p-polarized light more efficiently in the light G.

Figure 3:
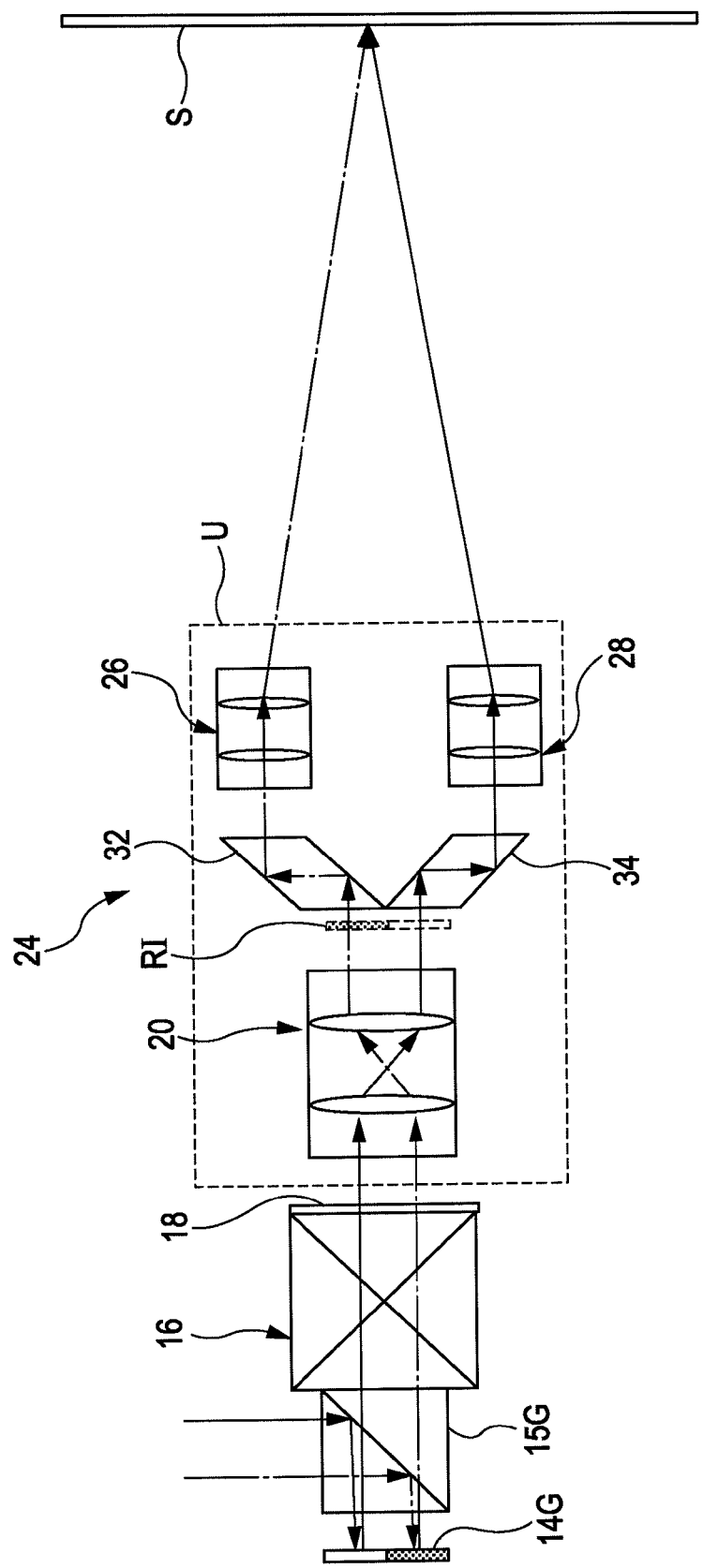
FIG. 3 shows a state in which a phase difference corrector is not provided.

For simplification of the drawings, the half-wave plates 17B and 17R are not shown in FIG. 3 and following figures.

(Quarter-Wave Plate 18)

The quarter-wave plate 18 is provided on the output plane 16D of the image synthesizing unit 16 with the orientation of the optical axis set to either 45 degrees or 135 degrees (zero degree is parallel to the paper plane).

The light output from the quarter-wave plate 18 is directed to the imaging lens 20, for example, in a right-handed circularly polarized state in a case of the light G (a left-handed circularly polarized state in a case of the light B and the light R), then left-handed circularly polarized (right-handed circularly polarized in a case of the light B and the light R) by a mirror reversal when the light is reflected by the imaging lens 20, and returns to pass through the quarter-wave plate 18 again.

As a result, the light is s-polarized (the electric field is vibrating in a plane perpendicular to the paper plane) (p-polarized in the case of the light B and the light R) in the image synthesizing unit 16, and enters the polarization beam splitter 15G.

The light B and the light R are s-polarized by the half-wave plates 17B and 17R, and then enter the polarization beam splitters 15R and 15B, respectively.

Because the polarization beam splitters 15R, 15G, and 15B reflect the s-polarized light, the returning light is reflected by them, and wasted without returning to surfaces of the reflective liquid crystal device 14R, 14G, and 14B. In this manner, the ghost image can be removed.

(Imaging Lens 20)

The imaging lens 20 serves as a relay lens, and forms a real image RI of the image formed by the reflective liquid crystal devices 14R, 14G, and 14B.

In other words, the imaging lens 20 accepts the image of the synthesized image for the left eye and the image of the synthesized image for the right eye from the image synthesizing unit 16, and forms their real images, which are mutually separated.

(Image Splitter 24)

The image splitter 24 directs the real image of the synthesized image for the left eye and the real image of the synthesized image for the right eye formed by the imaging lens 20 separately.

According to the embodiment, the image splitter 24 is configured with a first splitting prism 32 and a second splitting prism 34.

The first splitting prism 32 includes an incident plane 32A, a first reflecting plane 32B, a second reflecting plane 32C, and an output plane 32D.

The incident plane 32A receives the real image of the synthesized image for the left eye.

The first reflecting plane 32B reflects the real image of the synthesized image for the left eye input from the incident plane 32A substantially 90 degrees to the optical axis of the imaging lens 20.

The second reflecting plane 32C bends the real image of the synthesized image for the left eye reflected on the first reflecting plane 32B by substantially 90 degrees to a direction parallel to the optical axis of the imaging lens 20.

The output plane 32D outputs the real image of the synthesized image for the left eye reflected on the second reflecting plane 32C in a direction parallel to the optical axis of the imaging lens 20.

The second splitting prism 34 includes an incident plane 34A, a first reflecting plane 34B, a second reflecting plane 34C, and an output plane 34D.

The incident plane 34A receives the real image of the synthesized image for the right eye.

The first reflecting plane 34B reflects the real image of the synthesized image for the right eye input from the incident plane 34A substantially 90 degrees to the optical axis of the imaging lens 20.

The second reflecting plane 34C bends the real image of the synthesized image for the right eye reflected on the first reflecting plane 34B by substantially 90 degrees to a direction parallel to the optical axis of the imaging lens 20.

The output plane 34D outputs the real image of the synthesized image for the right eye reflected on the second reflecting plane 34C in a direction parallel to the optical axis of the imaging lens 20.

In other words, the image splitter 24 includes at least one reflecting plane, and spatially splits the real image into at least two by reflecting the real image formed by the imaging lens 20 on the reflecting plane.

In still other words, the image splitter 24 directs the real image of the synthesized image for the left eye and the real image of the synthesized image for the right eye, facing the output plane of the imaging lens 20, separately away from the output plane of the imaging lens 20.

Furthermore, an optical path formed by the first splitting prism 32 and an optical path formed by the second splitting prism 34 extend on an identical plane, and they are spaced from each other in a direction at right angles to the optical axis of the imaging lens 20. Therefore, the output plane 32D of the first splitting prism 32 and the output plane 34D of the second splitting prism 34 are positioned with a space between them in the direction at right angles to the optical axis of the imaging lens 20.

In other words, the image splitter 24 is configured to direct the real image of the synthesized image for the left eye and the real image of the synthesized image for the right eye formed by the imaging lens 20 to the positions with the space between them in the direction at right angles to the optical axis of the imaging lens 20.

(First and Second Projection Lenses 26 and 28)

The first projection lens 26 forms an image for the left eye by projecting the real image of the synthesized image for the left eye split by the image splitter 24 on the screen S.

The second projection lens 28 forms an image for the right eye by projecting the real image of the synthesized image for the right eye split by the image splitter 24 on the screen S.

That is, the first and the second projection lenses 26 and 28 enlarge the real images from the reflective liquid crystal devices 14R, 14G, and 14B and project the enlargement on the screen S.

In other words, the first and the second projection lenses 26 and 28 superimpose the left and right real images split by the image splitter 24 on the screen S, thereby reforming the image.

That is, the image reformed on the screen S is an image formed from the real images that are split by the image splitter 24, reformed by the first and the second projection lenses 26 and 28, and superimposed.

(Phase Difference Corrector 22)

According to the embodiment, the phase difference corrector 22 is disposed between the imaging lens 20 and the image splitter 24.

Details of the phase difference corrector 22 will be described later.

In FIG. 1, a 3D projection optical unit U includes the imaging lens 20, the phase difference corrector 22, the image splitter 24, and the first and the second projection lenses 26 and 28.

The real image RI from each of the reflective liquid crystal devices 14R, 14G, and 14B is formed by the imaging lens 20 immediately in front of the first and the second splitting prisms 32 and 34.

The light emitted from the light source 12A reflecting a display area of the images for the left eye and the right eye described above (indicated by the solid lines and dashed lines) is split by the first and the second splitting prisms 32 and 34 with respect to each display area of the images for the left eye and the right eye. The light then proceeds onto the screen S via the first and the second projection lenses 26 and 28.

To split the imposed light projected onto the screen S for the left eye and the right eye, there are various technologies based on the related art, such as a method of using different polarizing direction or a method of using different dispersion wavelength ranges, between the images for the left eye and the right eye.

A polarizing filter and a color separating filter are used to perform this, and they may be disposed in front of and behind the real image RI formed by the imaging lens 20.

For example, these filters may be disposed immediately in front of or behind the real image, between the first and the second splitting prisms 32 and 34 and the first and the second projection lenses 26 and 28, or behind the first and the second projection lenses 26 and 28 (not shown).

To view the image, a viewer may wear glasses including the polarizing filter and the color separating filter so that only the corresponding light enters each of the left eye and the right eye.

Next, a mechanism of occurrence of the ghost image is explained with reference to FIGS. 3 and 4.

Figure 4:
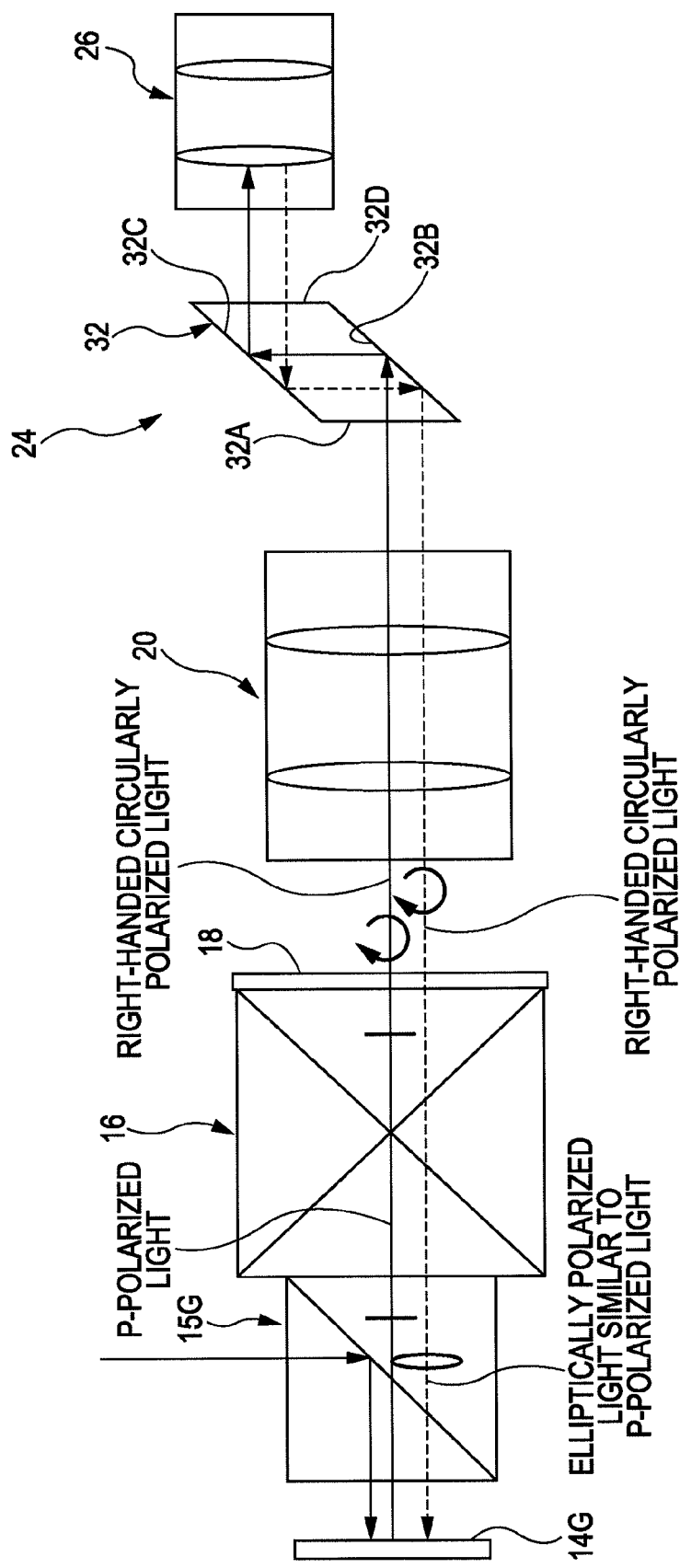
FIG. 4 illustrates occurrence of a ghost image in a state which the phase difference corrector is not provided.

For simplification of the explanation, FIG. 3 depicts the optical path of the light G alone by omitting the illuminating unit 12 and a part of the image forming unit 14, and FIG. 4 depicts only one set of the splitting prism and the projection lens.

As shown in FIG. 4, the light output from the image synthesizing unit 16 passes through the quarter-wave plate 18 to become, for example, a right-handed circular light, and proceeds to the imaging lens 20.

The light reflected from the plane of each lens forming the imaging lens 20 is removed by the function of the quarter-wave plate 18 described above.

On the other hand, the light output from the imaging lens 20 enters the first splitting prism 32, and proceeds to the first projection lens 26 after reflected twice on the first and the second reflecting planes 32B and 32C.

It is widely found that a phase difference (p-polarization–s-polarization) is generally generated to change the polarization state when light is reflected.

The light is fully reflected in the first splitting prism 32 in FIG. 4, and it is found that an amount δ of the phase difference (p-polarization–s-polarization) in a case of the total reflection is obtained by the following equation (refer to, for example, Tadao Tsuruta, "Applied Optics I" Baifukan, p. 40):

$$\tan(\delta/2) = (n1/n2) \cdot \cos\theta \sqrt{\{(n1/n2)^2 \sin^2\theta - 1\}/\sin^2\theta} \quad (1),$$

where n1 is a refractive index of the medium of the prism, n2 is a refractive index of the medium outside the prism, θ is an incident angle of the light on the reflecting plane.

In FIGS. 3 and 4, n2 may be 1 because the first splitting prism 32 is placed in the air.

When it is assumed that n1 is 1.5168 (BK7 glass) and θ is 45 degrees, it is obtained that δ is equal to 39.75 degrees. However, because the light is reflected two times in the prism, the phase difference generated by passing through the prism is approximately 80 degrees.

Because the light reflected on the surface of each lens in the first projection lens 26 returns to the prism, the consequent phase difference generated by the reciprocation through the prism is approximately 160 degrees.

Otherwise, if there is provided any filter between the first splitting prism 32 and the first projection lens 26, the light reflected on the surface of the filter returns to the prism, and therefore the consequent phase difference generated by the reciprocation through the prism is approximately 160 degrees.

In this manner, for example, when the light emitted from the quarter-wave plate 18 is right-handed circularly polarized, the light reflected and returned nearly to the quarter-wave plate 18 is almost right-handed circularly polarized.

The phase difference between the right-handed circularly polarized light and the left-handed circularly polarized light is 180 degrees.

On the other hand, when the right-handed circularly polarized light is reflected on the surface of the lens, it is converted into the left-handed circularly polarized light. In this case, however, because the light is affected by the phase difference of nearly 180 degrees on the way, the light gets almost right-handed circularly polarized.

Therefore, the light having passed through the quarter-wave plate 18 again to reach the polarization beam splitter 15G is not s-polarized, but it becomes an elliptically polarized light similar to the p-polarized light.

As a result, a major part of the light passes through the polarization beam splitter 15G to reach the surface of the reflective liquid crystal device 14G and the light reflected on the surface reaches the screen S, causing the ghost image. In this manner, it is disadvantageous that an influence by the reflected light generated by the splitting prism is hard to completely remove by the technology of removing the ghost image by providing the quarter-wave plate 18 based on the related art.

The same phenomenon occurs in the second splitting prism 34.

Although the above explanation was given using the light G, the same logic is applied to the light B and the light R, except that the polarizing directions are switched (for more detail, refer to the above explanation).

According to the embodiment, the influence by the reflected light generated by the splitting prism is removed by providing the phase difference corrector 22.

Detailed explanation about the phase difference corrector 22 is given below with reference to FIGS. 5 and 6.

Figure 5:
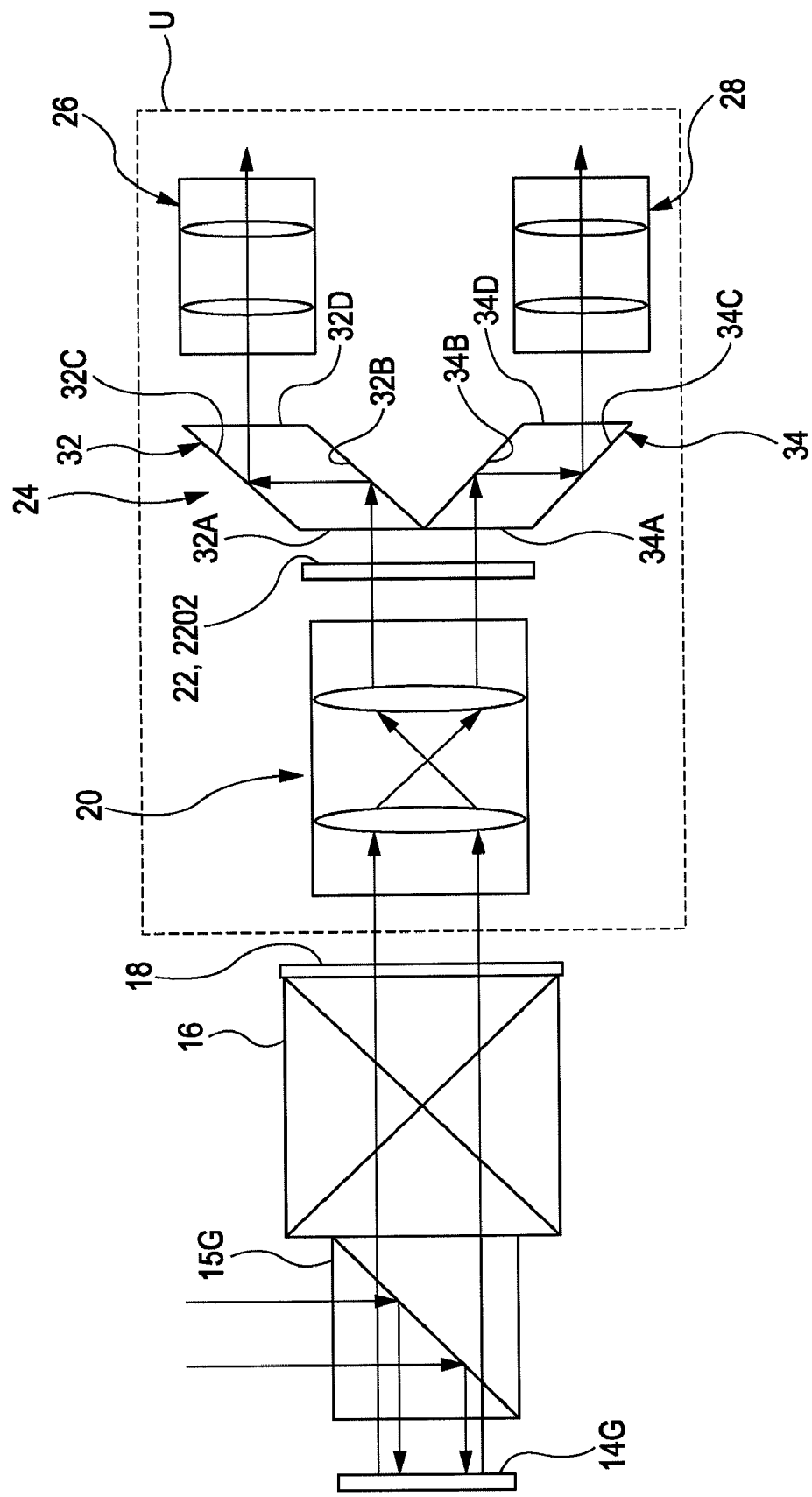
FIG. 5 shows a state in which the phase difference corrector is provided.
Figure 6:
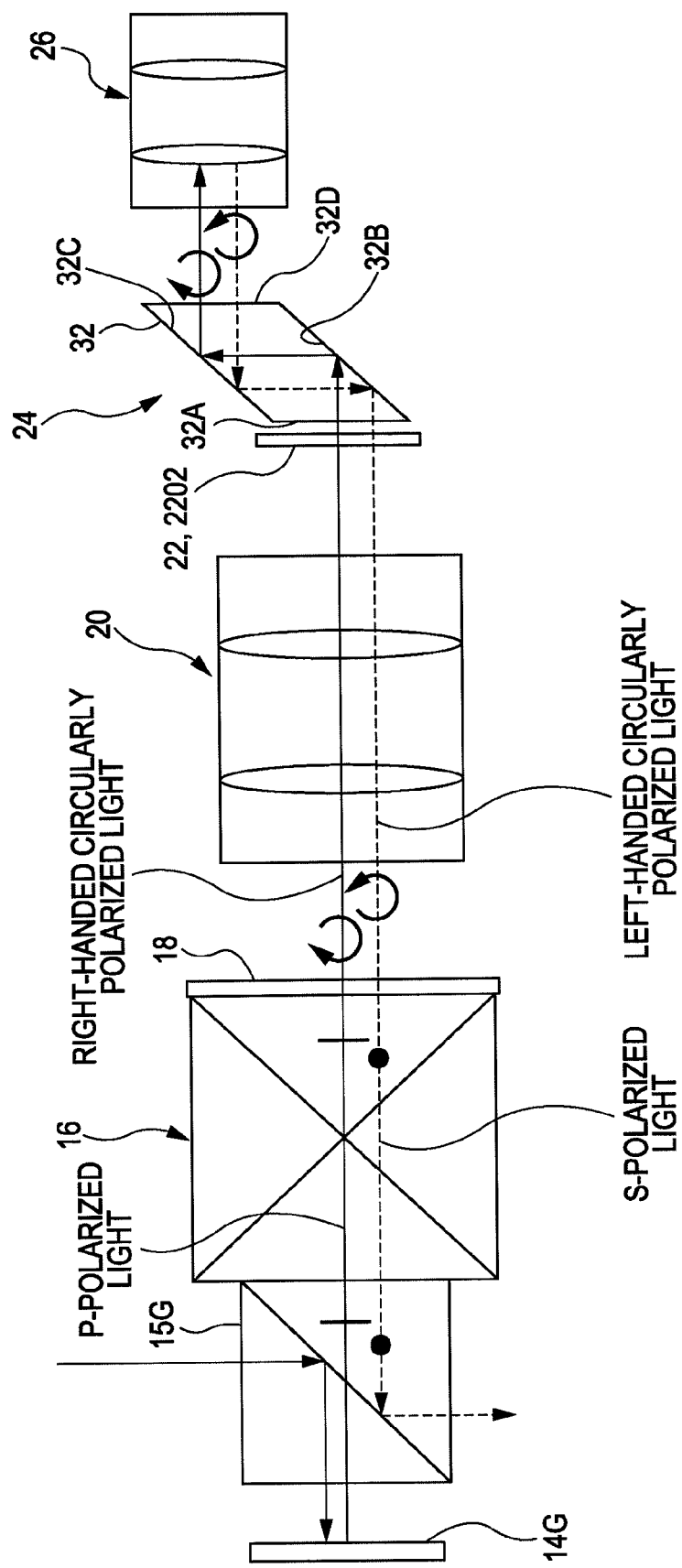
FIG. 6 illustrates removal of the ghost image by the phase difference corrector.

For simplification of the explanation, the illuminating unit 12 and a part of the image forming unit 14 are omitted in FIG. 5, and FIG. 6 depicts only one set of the splitting prism and the projection lens.

The s-polarized light (indicated by the solid arrows) emitted by the illuminating unit 12 (shown in FIG. 1) is reflected by the polarization beam splitter 15G, proceeds to the reflective liquid crystal device 14G, where the polarization of the light is modulated and reflected, and passes through the polarization beam splitter 15G as the p-polarized light.

The p-polarized light then passes through the color composition prism 16, the quarter-wave plate 18, and the imaging lens 20.

According to the embodiment, the phase difference corrector 22 includes a wave plate 2202 disposed between the imaging lens 20 and the incident planes 32A and 34A of the first and the second splitting prisms 32 and 34.

Accordingly, the light having passed through the imaging lens 20 passes through the wave plate 2202, and then reaches the first and the second splitting prisms 32 and 34.

The light output from the first and the second splitting prisms 32 and 34 reaches the screen S via the first and the second projection lenses 26 and 28, and forms the image output from the reflective liquid crystal devices.

The wave plate 2202 is configured to correct (cancel) the phase difference generated by the first splitting prism 32 and the second splitting prism 34 using the phase difference generated by the wave plate 2202.

In other words, the phase difference generated by the wave plate 2202 is determined so that the total amount of this phase difference and the phase difference generated by the first splitting prism 32 and the second splitting prism 34 is equal to zero.

In still other words, the phase difference generated by the wave plate 2202 is determined so that the polarization state of the light output from the first splitting prism 32 and the second splitting prism 34 does not change from the polarization state of the light before entering the wave plate 2202.

In short, the phase difference corrector 22 corrects the phase difference between the p-polarized light and the s-polarized light generated by the first and the second reflecting planes 32B, 32C, 34B, and 34C of the image splitter 24.

According to the embodiment, the phase difference corrector 22 can be configured with a single wave plate 2202 having an area sufficient for the light output from the imaging lens 20 to the incident planes 32A and 34A to pass through.

In other words, because the phase difference corrector 22 is disposed between the imaging lens 20 and the incident planes 32A and 34A, only one phase difference corrector 22 is used.

A mechanism of removing the ghost image according to the embodiment is further explained below with reference to FIG. 6. Although the first splitting prism 32 is used as the splitting prism in the following explanation, it should be appreciated that the same logic can be applied to the second splitting prism 34.

As indicated by the solid arrows, the light emitted by the light source 12A (shown in FIG. 1) passes through the reflective liquid crystal device 14G, the polarization beam splitter 15G, the color composition prism 16, and the quarter-wave plate 18 to be right-handed circularly polarized, and further passes through the imaging lens 20.

The light having passed through the imaging lens 20 then passes through the wave plate 2202 and the first splitting prism 32.

As described above, the total amount of the phase differences of the light having passed through the imaging lens 20 generated by the wave plate 2202 and the first splitting prism 32 is equal to zero, and therefore, the polarization state of the light having passed through the imaging lens 20 does not change from the right-handed circularly polarized state before entering the wave plate 2202 and after being output from the first splitting prism 32.

Accordingly, the light having passed through the imaging lens 20 enters the first projection lens 26 retaining the same right-handed circularly polarized state after being output from the first splitting prism 32.

An optical path of the light reflected by the first projection lens 26 is indicated by the dashed arrows.

The reflected light having passed through the first splitting prism 32 and the wave plate 2202 then enters the quarter-wave plate 18 retaining the left-handed circularly polarized state as converted at the time of reflection by the same mechanism as described above.

The left-handed circularly polarized reflected light that entered the quarter-wave plate 18 is s-polarized by the quarter-wave plate 18, enters the polarization beam splitter 15G via the color composition prism 16, is reflected here, and is wasted.

The light reflected by the projection lenses 26 and 28 that may cause the ghost image can be removed in this manner.

An operation of the phase difference corrector 22 was explained above taking an example of the light passing through or reflected by the polarization beam splitter 15G and the reflective liquid crystal device 14G. However, it should be appreciated that the same effect is brought about by the phase difference corrector 22 in the case of the light passing through or reflected by the polarization beam splitters 15R and 15B and the reflective liquid crystal devices 14R and 14B.

As described above, according to the embodiment, there is provided the phase difference corrector 22 that corrects the phase difference between the p-polarized light and the s-polarized light generated by the first and the second reflecting planes 32B, 32C, 34B, and 34C of the image splitter 24.

In this manner, because the light reflected by the projection lenses 26 and 28 is removed before reaching the reflective liquid crystal devices 14R, 14G, and 14B, the occurrence of the ghost image is prevented, which is advantageous in improving the image quality.

Furthermore, according to the embodiment, because the phase difference corrector 22 is provided between the imaging lens 20 and the image splitter 24, only one phase difference corrector 22 is used, which is advantageous in reducing the number of components and simplifying the configuration.

Another Embodiment

Next, another embodiment of the present invention will be described with reference to FIGS. 7 and 8.

The same reference characters are used in the other embodiment for the parts and constituents same as in the embodiment described earlier.

Figure 7:
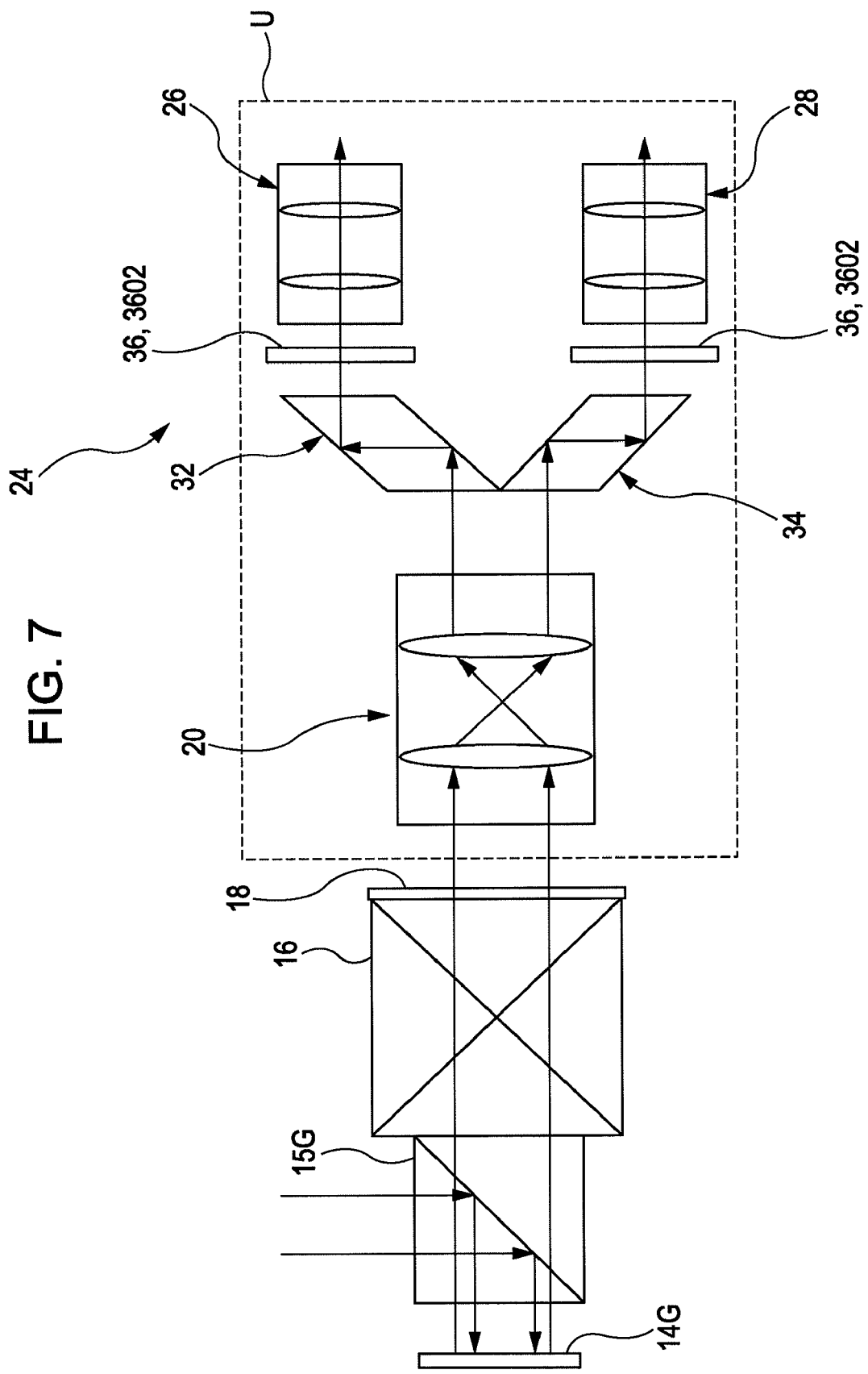
FIG. 7 shows a projection display apparatus according to another embodiment of the present invention with a part thereof omitted.
Figure 8:
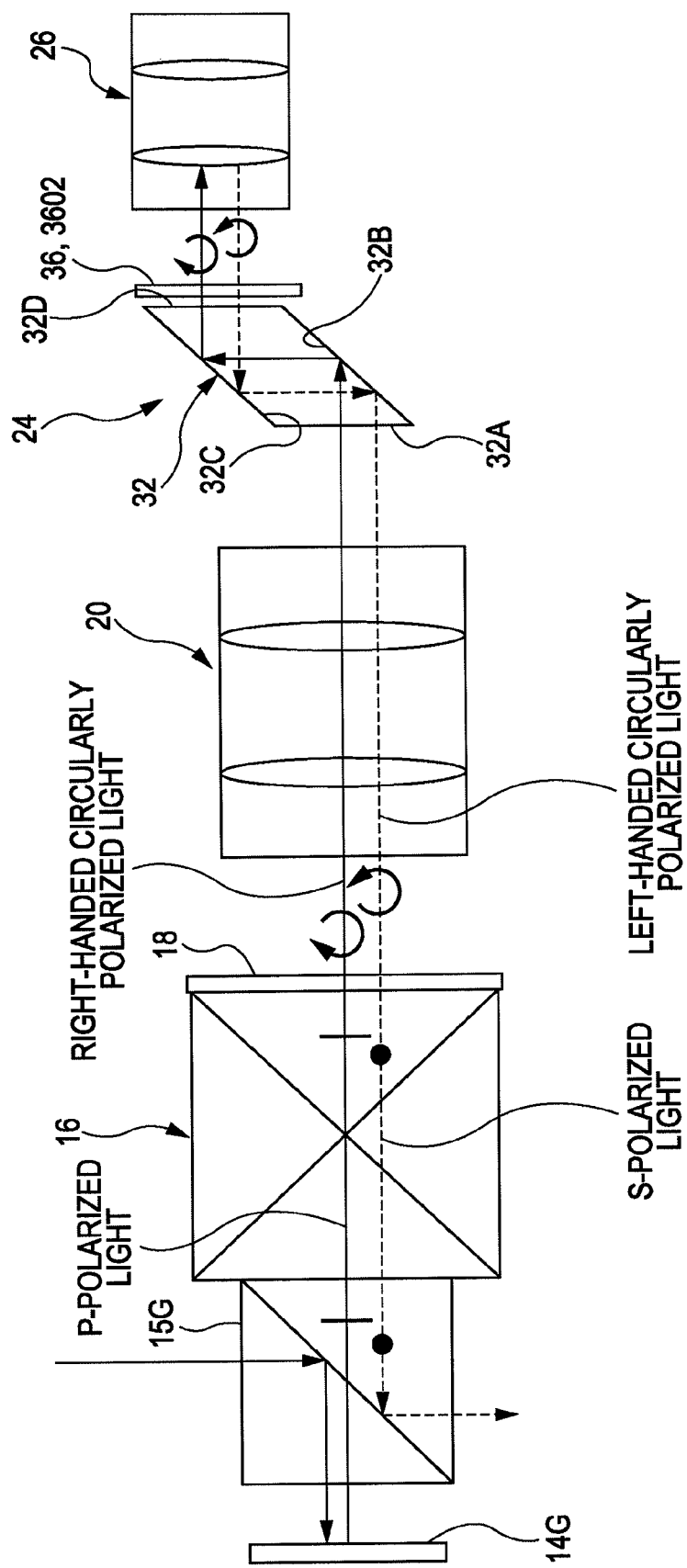
FIG. 8 illustrates removal of the ghost image by the phase difference corrector according to the other embodiment.

For simplifying the explanation, the illuminating unit 12 and a part of the image forming unit 14 are omitted in FIG. 7, and FIG. 8 depicts only one set of the splitting prism and the projection lens.

As shown in FIG. 7, the other embodiment is different from the embodiment described earlier in that phase difference corrector 36 are respectively provided between the image splitter 24 and the first projection lens 26 and between the image splitter 24 and the second projection lens 28, and that two phase difference corrector 36 are provided.

An s-polarized light (indicated by the solid arrows) emitted by the illuminating unit 12 (shown in FIG. 1) is reflected by the polarization beam splitter 15G, proceeds to the reflective liquid crystal device 14G, where the polarization of the light is modulated and reflected, and passes through the polarization beam splitter 15G as the p-polarized light.

The p-polarized light then passes through the color composition prism 16, the quarter-wave plate 18, and the imaging lens 20, and enters the first and the second splitting prisms 32 and 34.

The light enters from the imaging lens 20 to the first and the second splitting prisms 32 and 34.

According to the other embodiment, the phase difference corrector 36 includes wave plates 3602 respectively provided between the first splitting prism 32 and the first projection lens 26 and between the second splitting prism 34 and the second projection lens 28.

Accordingly, the light output from the first and the second splitting prisms 32 and 34 passes through the respective wave plates 3602, and then reaches the screen S via the first and the second projection lenses 26 and 28 to form the image output from the reflective liquid crystal devices.

The two wave plates 3602 are configured to respectively correct (cancel) the phase differences generated by the first splitting prism 32 and the second splitting prism 34 using the phase differences generated by the wave plates 3602.

In other words, the phase difference generated by one of the wave plate 3602 is determined so that the total amount of this phase difference and the phase difference generated by the first splitting prism 32 is equal to zero.

The phase difference generated by the other of the wave plate 3602 is determined so that the total amount of this phase difference and the phase difference generated by the second splitting prism 34 is equal to zero.

In still other words, the phase difference generated by each of the wave plates 3602 is determined so that the polarization state of the light output from each of the wave plates 3602 does not change from the polarization state of the light before entering first splitting prism 32 and the second splitting prism 34.

In short, the phase difference corrector 36 corrects the phase difference between the p-polarized light and the s-polarized light generated by the first and the second reflecting planes 32B, 32C, 34B, and 34C of the image splitter 24.

Furthermore, according to the other embodiment, each of the two wave plates 3602 as the phase difference corrector 36 is provided between the image splitter 24 and each of the first and the second projection lenses 26 and 28.

Therefore, the two wave plates 3602 are sufficiently distanced from the position of the real image RI formed between the imaging lens 20 and the image splitter 24.

A mechanism of removing the ghost image according to the other embodiment is further explained below with reference to FIG. 8. Although the first splitting prism 32 is used as the splitting prism in the following explanation, it should be appreciated that the same logic can be applied to the second splitting prism 34.

As indicated by the solid arrows, the light emitted by the light source 12A (shown in FIG. 1) passes through the reflective liquid crystal device 14G, the polarization beam splitter 15G, the color composition prism 16, and the quarter-wave plate 18 to be right-handed circularly polarized, and further passes through the imaging lens 20.

The light having passed through the imaging lens 20 then passes through the first splitting prism 32 and the wave plate 3602.

As described above, the total amount of the phase differences of the light having passed through the imaging lens 20 generated by the first splitting prism 32 and the wave plate 3602 is equal to zero, and therefore, the polarization state of the light having passed through the imaging lens 20 does not change from the right-handed circularly polarized state before entering the first splitting prism 32 and after being output from the wave plate 3602.

Accordingly, the light having passed through the imaging lens 20 enters the first projection lens 26 retaining the same right-handed circularly polarized state after being output from the wave plate 3602.

An optical path of the light reflected by the first projection lens 26 is indicated by the dashed arrows.

The reflected light having passed through the first splitting prism 32 and the wave plate 3602 then enters the quarter-wave plate 18 retaining the left-handed circularly polarized state as converted at the time of reflection by the same mechanism as described above.

The left-handed circularly polarized reflected light that entered the quarter-wave plate 18 is s-polarized by the quarter-wave plate 18, enters the polarization beam splitter 15G via the color composition prism 16, is reflected here, and is wasted.

The light reflected by the projection lenses 26 and 28 that may cause the ghost image can be removed in this manner.

An operation of the phase difference corrector 36 was explained above taking an example of the light passing through or reflected by the polarization beam splitter 15G and the reflective liquid crystal device 14G. However, it should be appreciated that the same effect is brought about by the phase difference corrector 36 in the case of the light passing through or reflected by the polarization beam splitters 15R and 15B and the reflective liquid crystal devices 14R and 14B.

As described above, according to the other embodiment, the same effect as in the embodiment described earlier is brought about.

Furthermore, according to the other embodiment, because each of the phase difference corrector 36 is provided between the image splitter 24 and each of the first and the second projection lenses 26 and 28, the phase difference corrector 36 is sufficiently distanced from the position of the real image RI.

As a result, it is advantageous in that high image quality can be retained by suppressing an influence of dust on the phase difference corrector 36 given to the image displayed on the screen S.

Still Another Embodiment

Next, still another embodiment of the present invention will be described with reference to FIGS. 9 and 10.

Figure 9:
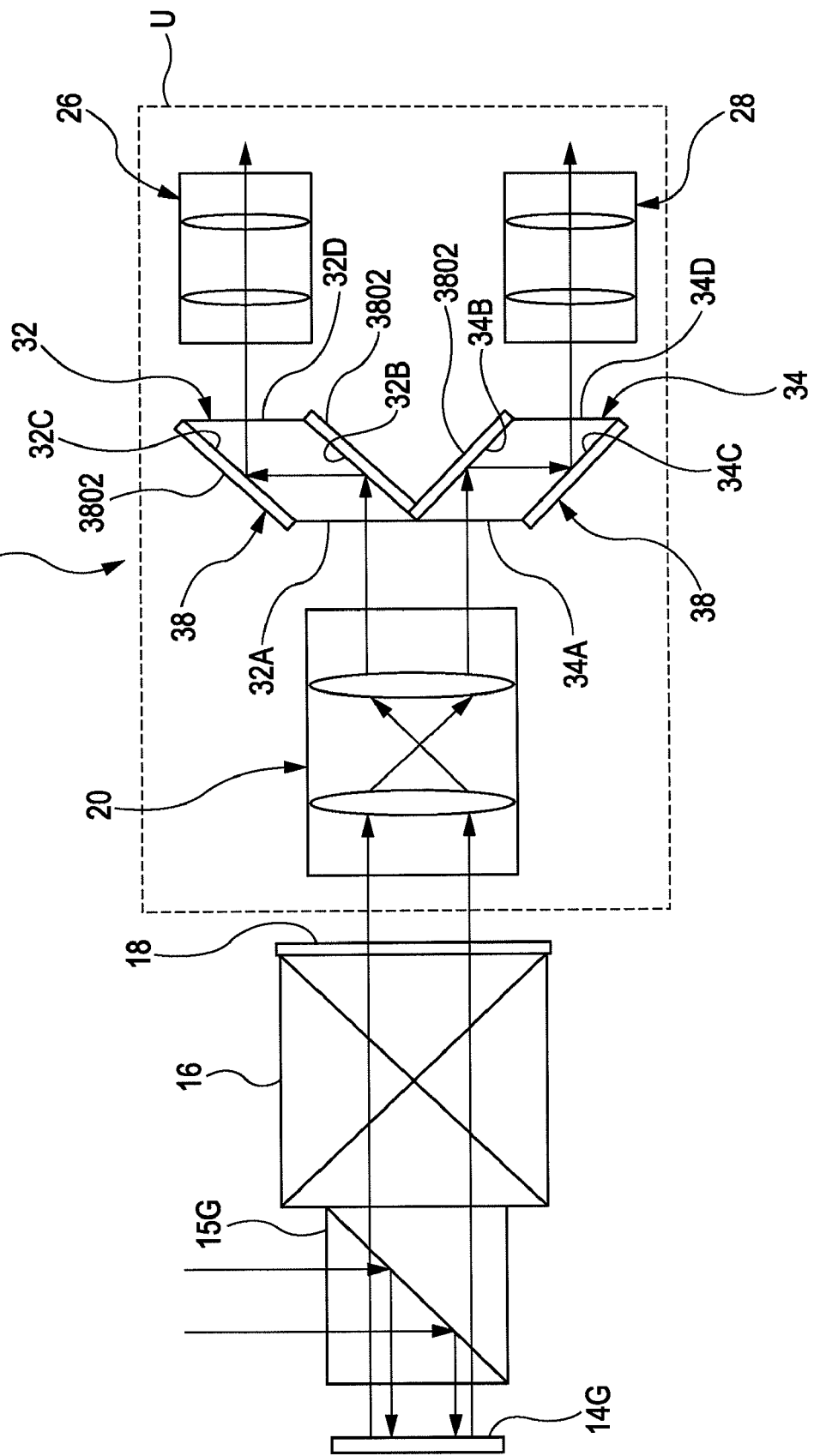
FIG. 9 shows a projection display apparatus according to still another embodiment of the present invention with a part thereof omitted.
Figure 13:
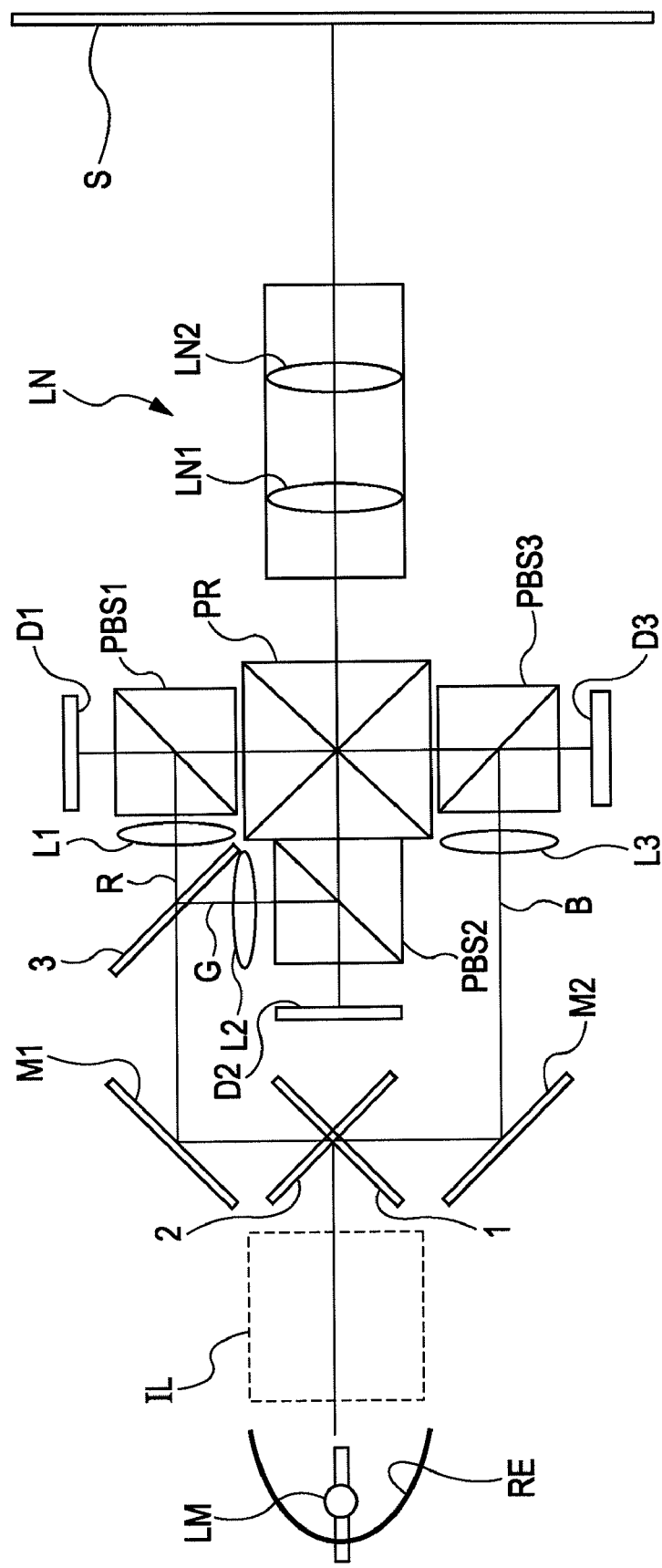
FIG. 13 shows the basic configuration of a general 3-chip CCD reflective liquid crystal projector.
Figure 14:
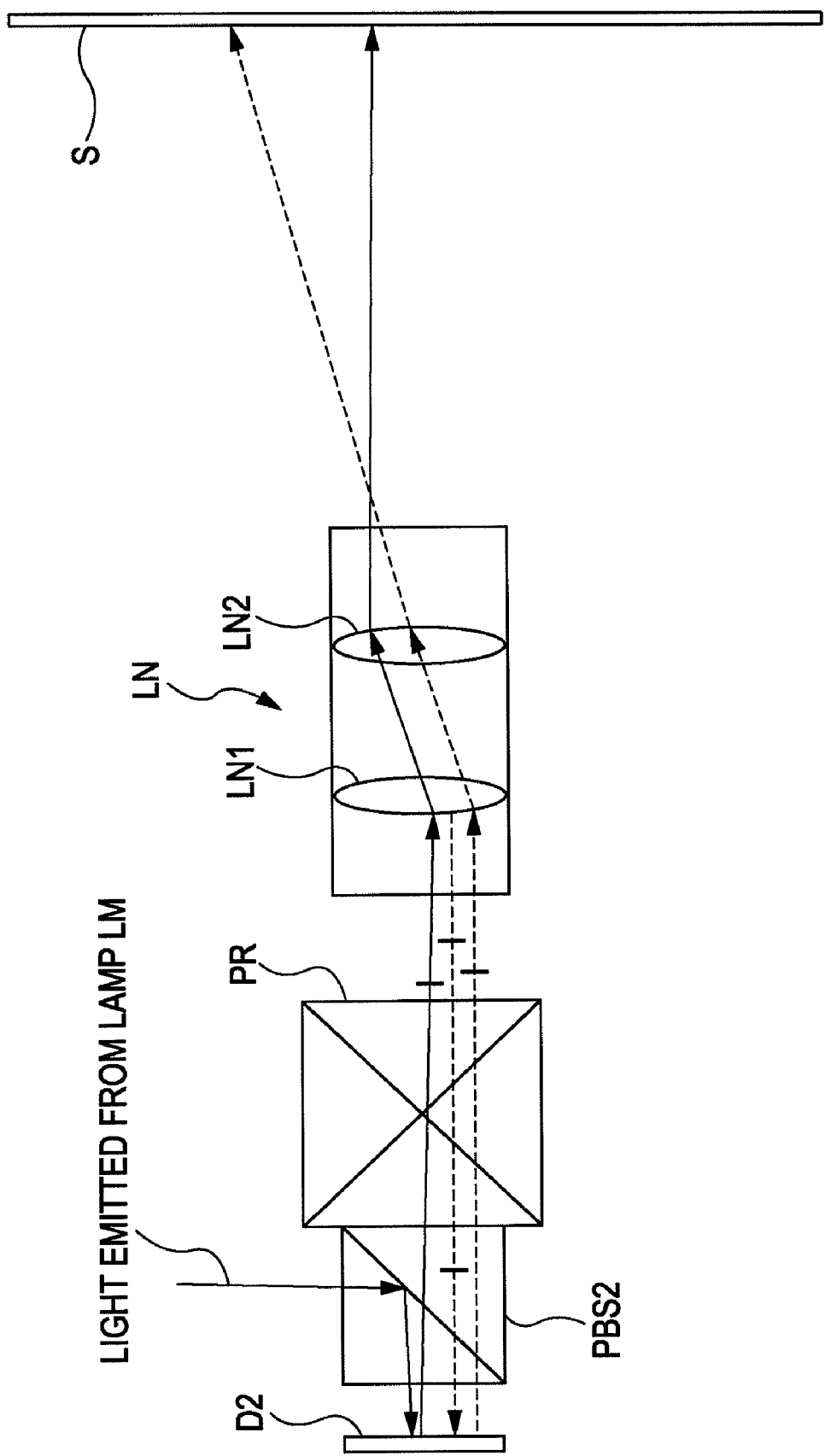
FIG. 14 illustrates a behavior of light reflected on the surface of each lens of a projection lens.
Figure 15:
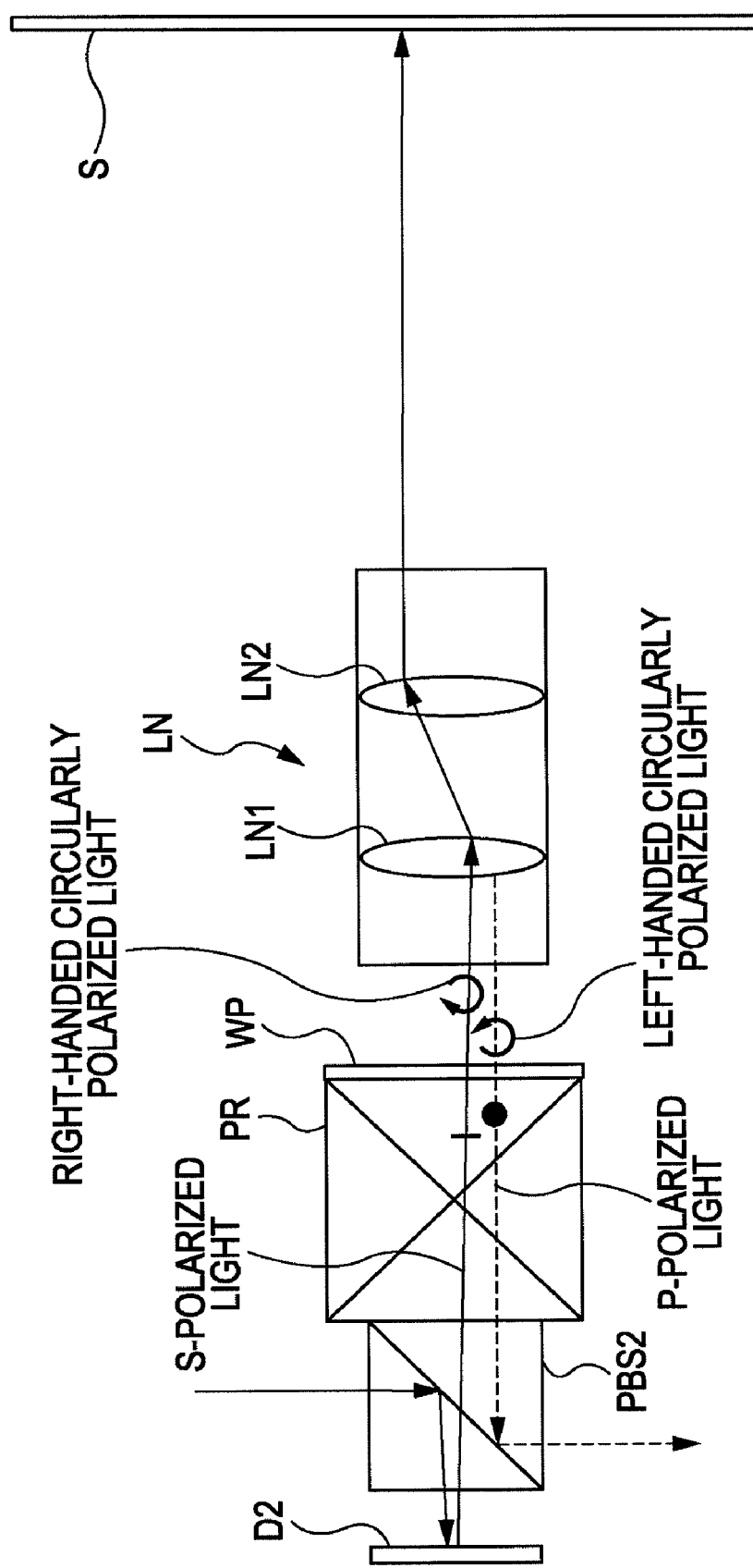
FIG. 15 illustrates removal of the ghost image by a quarter-wave plate.

For simplifying the explanation, the illuminating unit 12 and a part of the image forming unit 14 are omitted in FIG. 9, and FIG. 10 depicts only one set of the splitting prism and the projection lens.

As shown in FIG. 9, the other embodiment is different from the embodiments described earlier in that phase difference corrector 38 are provided to the first and the second splitting prisms 32 and 34.

An s-polarized light (indicated by the solid arrows) emitted by the illuminating unit 12 (shown in FIG. 1) is reflected by the polarization beam splitter 15G, proceeds to the reflective liquid crystal device 14G, where the polarization of the light is modulated and reflected, and passes through the polarization beam splitter 15G as the p-polarized light.

The p-polarized light then passes through the color composition prism 16, the quarter-wave plate 18, and the imaging lens 20, and enters the first and the second splitting prisms 32 and 34.

According to the other embodiment, the phase difference corrector 38 includes four optical thin films for correcting phase difference 3802 respectively formed on the first and the second reflecting planes 32B and 32C of the first splitting prism 32 and the first and the second reflecting planes 34B and 34C of the second splitting prism 34.

The light having entered the first and the second splitting prisms 32 and 34 is output from the output planes 32D and 34D via the respective optical thin films for correcting phase difference 3802, and then reaches the screen S via the first and the second projection lenses 26 and 28 to form the image output from the reflective liquid crystal devices.

The two optical thin films for correcting phase difference 3802 formed on the first splitting prism 32 are configured to respectively correct (cancel) the phase difference generated by the first splitting prism 32 using the phase differences generated by the optical thin films for correcting phase difference 3802.

The two optical thin films for correcting phase difference 3802 formed on the second splitting prism 34 are configured to respectively correct (cancel) the phase difference generated by the second splitting prism 34 using the phase differences generated by the optical thin films for correcting phase difference 3802.

In other words, the phase differences generated by the two optical thin films for correcting phase difference 3802 in the first splitting prism 32 are determined so that the total amount of these phase differences and the phase difference generated by the first splitting prism 32 is equal to zero.

Furthermore, the phase differences generated by the two optical thin films for correcting phase difference 3802 in the second splitting prism 34 are determined so that the total amount of these phase differences and the phase difference generated by the second splitting prism 34 is equal to zero.

In still other words, the phase differences generated by the two optical thin films for correcting phase difference 3802 in the first splitting prism 32 are determined so that the polarization state of the light output from the first splitting prism 32 does not change from the polarization state of the light before entering the first splitting prism 32.

Moreover, the phase differences generated by the two optical thin films for correcting phase difference 3802 in the second splitting prism 34 are determined so that the polarization state of the light output from the second splitting prism 34 does not change from the polarization state of the light before entering the second splitting prism 34.

In short, the phase difference corrector 38 corrects the phase difference between the p-polarized light and the s-polarized light generated by the first and the second reflecting planes 32B, 32C, 34B, and 34C of the image splitter 24.

To form such an optical thin film for correcting phase difference 3802, various materials based on the related art, such as a material identical to the optical thin film for correcting phase difference formed on a reflecting plane of a roof prism of binoculars, may be employed.

A mechanism of removing the ghost image according to the other embodiment is further explained below with reference to FIG. 10. Although the first splitting prism 32 is used as the splitting prism in the following explanation, it should be appreciated that the same logic can be applied to the second splitting prism 34.

As indicated by the solid arrows, the light emitted by the light source 12A (shown in FIG. 1) passes through the reflective liquid crystal device 14G, the polarization beam splitter 15G, the color composition prism 16, and the quarter-wave plate 18 to be right-handed circularly polarized, and further passes through the imaging lens 20.

The light having passed through the imaging lens 20 then enters the first splitting prism 32 to be reflected by the two optical thin films for correcting phase difference 3802.

As described above, the total amount of the phase differences of the light having passed through the imaging lens 20 generated by the first splitting prism 32 and the two optical thin films for correcting phase difference 3802 is equal to zero.

Therefore, the polarization state of the light having passed through the imaging lens 20 does not change from the right-handed circularly polarized state before entering the first splitting prism 32 and after being output from the first splitting prism 32.

Accordingly, the light having passed through the imaging lens 20 enters the first projection lens 26 retaining the same right-handed circularly polarized state after being output from the first splitting prism 32.

An optical path of the light reflected by the first projection lens 26 is indicated by the dashed arrows.

The reflected light having passed through the first splitting prism 32 and the two optical thin films for correcting phase difference 3802 then enters the quarter-wave plate 18 retaining the left-handed circularly polarized state as converted at the time of reflection by the same mechanism as described above.

The left-handed circularly polarized reflected light that entered the quarter-wave plate 18 is s-polarized by the quarter-wave plate 18, enters the polarization beam splitter 15G via the color composition prism 16, is reflected here, and is wasted.

The light reflected by the projection lenses 26 and 28 that may cause the ghost image can be removed in this manner.

An operation of the phase difference corrector 38 was explained above taking an example of the light passing through or reflected by the polarization beam splitter 15G and the reflective liquid crystal device 14G. However, it should be appreciated that the same effect is brought about by the phase difference corrector 38 in the case of the light passing through or reflected by the polarization beam splitters 15R and 15B and the reflective liquid crystal devices 14R and 14B.

As described above, according to the other embodiment, the same effect as in the embodiments described earlier is brought about.

Furthermore, according to the other embodiment, because the phase difference corrector 38 is configured with the optical thin films for correcting phase difference 3802 formed on the reflecting planes 32B, 32C, 34B, and 34C of the first and the second splitting prisms 32 and 34, it is advantageous in reducing the number of components and making the size of the apparatus smaller.

Moreover, according to the other embodiment, the optical thin film for correcting phase difference 3802 is formed on each of the two reflecting planes 32B and 32C of the first splitting prism 32, and the optical thin film for correcting phase difference 3802 is also formed on each of the two reflecting planes 34B and 34C of the second splitting prism 34.

However, the optical thin film for correcting phase difference 3802 may be formed on one of the two reflecting planes 32B and 32C of the first splitting prism 32, and the optical thin film for correcting phase difference 3802 may also be formed on one of the two reflecting planes 34B and 34C of the second splitting prism 34.

In short, the optical thin film for correcting phase difference 3802 may be configured in any way so far as the phase difference between the p-polarized light and the s-polarized light generated by the first and the second reflecting planes 32B, 32C, 34B, and 34C of the image splitter 24 is corrected.

Furthermore, the same effect as described above can be brought about by applying an optical crystal having anisotropic refractive indices such as a crystal onto the reflecting planes 32B, 32C, 34B, and 34C of the first and the second splitting prisms 32 and 34 instead of each of the optical thin films for correcting phase difference 3802 according to the other embodiment.

In this case, the light reciprocates in the material (optical crystal). A thickness and a direction of an optic axis may be determined so that the phase difference generated by the reciprocation does not change the polarization state.

In other words, the thickness and the direction of the optic axis of the optical crystal may be determined so that the optical crystal can correct the phase difference between the p-polarized light and the s-polarized light generated by the first and the second reflecting planes 32B, 32C, 34B, and 34C of the image splitter 24.

Yet Another Embodiment

Next, yet another embodiment of the present invention will be described with reference to FIGS. 11A, 11B, 12A, and 12B.

For simplifying the explanation, the illuminating unit 12 and a part of the image forming unit 14 are omitted in FIGS. 11A and 11B, and each of FIGS. 12A and 12B depicts only one set of the splitting prism and the projection lens.

As shown in FIGS. 11A and 11B, the other embodiment is different from the embodiments described earlier in a configuration of a first splitting prism 40 and a second splitting prism 42 included in the image splitter 24 and a configuration of a phase difference corrector 44.

As shown in FIGS. 11A and 11B, the image splitter 24 includes the first and the second splitting prisms 40 and 42 with the same size and shape.

The first splitting prism 40 includes image-splitting reflecting planes 4002 intersecting an incident optical axis L11 proceeding from the imaging lens 20 to the image splitter 24 to use as the reflecting plane that reflects the real image formed by the imaging lens 20.

The second splitting prism 42 includes image-splitting reflecting planes 4202 intersecting an incident optical axis L12 proceeding from the imaging lens 20 to the image splitter 24 to use as the reflecting plane that reflects the real image formed by the imaging lens 20.

In other words, the image splitter 24 spatially splits the real image into two split real images by reflecting the real image formed by the imaging lens 20 by the two image-splitting reflecting planes 4002 and 4202.

The phase difference corrector 44 is configured with a phase difference correcting prism 46 each disposed between the first splitting prism 40 and the first projection lens 26 and between the second splitting prism 42 and the second projection lens 28.

The phase difference correcting prisms 46 are similar to the first and the second splitting prisms 40 and 42 in shape, and they are formed with the same material.

Each of the phase difference correcting prisms 46 includes a phase-difference-correcting reflecting plane 4602 that extends along a plane intersecting each of the image-splitting reflecting planes 4002 and 4202.

Among the two image-splitting reflecting plane 4002 and 4202, the image-splitting reflecting plane 4002 and the phase-difference-correcting reflecting plane 4602 are disposed so that the incident optical axis L11 is at right angles to a plane that includes an incident optical axis L31 proceeding from the first splitting prism 40 to the phase difference corrector 44 and an output optical axis L21 proceeding from the phase difference corrector 44 to the first projection lens 26.

Among the two image-splitting reflecting planes 4002 and 4202, the image-splitting reflecting plane 4202 and the phase-difference-correcting reflecting plane 4602 are disposed so that the incident optical axis L12 is at right angles to a plane that includes an incident optical axis L32 proceeding from the second splitting prism 42 to the phase difference corrector 44 and an output optical axis L22 proceeding from the phase difference corrector 44 to the second projection lens 28.

The s-polarized light (indicated by the solid arrows) emitted by the illuminating unit 12 (shown in FIG. 1) is reflected by the polarization beam splitter 15G, proceeds to the reflective liquid crystal device 14G, where the polarization of the light is modulated and reflected, and passes through the polarization beam splitter 15G as the p-polarized light.

The p-polarized light then passes through the color composition prism 16, the quarter-wave plate 18, and the imaging lens 20, and enters the first and the second splitting prisms 40 and 42 along the incident optical axes L11 and L12.

The light that entered the first and the second splitting prisms 40 and 42 reaches the respective phase difference correcting prisms 46, is output along the output optical axes L21 and L22, and then reaches the screen S via the first and the second projection lenses 26 and 28 to form the image output from the reflective liquid crystal devices.

A mechanism of removing the ghost image according to the other embodiment is further explained below with reference to FIGS. 12A and 12B. Although the first splitting prism 40 is used as the splitting prism in the following explanation, it should be appreciated that the same logic can be applied to the second splitting prism 42.

In FIG. 12A, as indicated by the solid arrows, the light emitted by the light source 12A (shown in FIG. 1) passes through the reflective liquid crystal device 14G, the polarization beam splitter 15G, the color composition prism 16, and the quarter-wave plate 18 to be, for example, right-handed circularly polarized, and further passes through the imaging lens 20.

The light having passed through the imaging lens 20 then enters the first splitting prism 40 along the incident optical axis L11, and it is output after being polarized perpendicular to the incident optical axis L11 by the image-splitting reflecting plane 4002.

The light having passed through the imaging lens 20 is reflected in the first splitting prism 40, thereby generating a phase difference.

Next, the light output from the first splitting prism 40 enters the phase difference correcting prism 46 along the incident optical axis L31, and the phase difference correcting prism 46 is similar to the first splitting prism 40 in shape and formed of the same material as the first splitting prism 40.

Therefore, the light output from the first splitting prism 40 generates the same amount of the phase difference at the time of reflection in the phase difference correcting prism 46 as the amount of the phase difference generated by the first splitting prism 40.

However, the image-splitting reflecting plane 4002 and the phase-difference-correcting reflecting plane 4602 are arranged so that the incident optical axis L11 is at right angles to the plane including the incident optical axis L31 and the output optical axis L21. This state is shown in FIG. 12B. FIG. 12B shows the configuration shown in FIG. 12A as seen from a direction indicated by an arrow XIIB.

Accordingly, a p-polarized plane in the first splitting prism 40 corresponds to an s-polarized plane in the phase difference correcting prism 46. Therefore, the phase difference generated in the phase difference correcting prism 46 offsets the phase difference generated in the first splitting prism 40.

As a result, the light output from the phase difference correcting prism 46 enters the first projection lens 26 retaining the same polarization state as before entering the first splitting prism 40.

An optical path of the light reflected by the first projection lens 26 is indicated by the dashed arrows.

The reflected light having passed through the phase difference correcting prism 46 and the first splitting prism 40 then enters the quarter-wave plate 18 retaining the left-handed circularly polarized state as converted at the time of reflection by the same mechanism as described above.

The left-handed circularly polarized reflected light that entered the quarter-wave plate 18 is s-polarized by the quarter-wave plate 18, enters the polarization beam splitter 15G via the color composition prism 16, is reflected here, and is wasted.

The light reflected by the projection lenses 26 and 28 that may cause the ghost image can be removed in this manner.

An operation of the phase difference corrector 44 was explained above taking an example of the light passing through or reflected by the polarization beam splitter 15G and the reflective liquid crystal device 14G. However, it should be appreciated that the same effect is brought about by the phase difference corrector 44 in the case of the light passing through or reflected by the polarization beam splitters 15R and 15B and the reflective liquid crystal devices 14R and 14B.

As described above, according to the other embodiment, the same effect as in the embodiments described earlier is brought about.

In the above embodiments, a case of preventing the ghost image generated by the light reflected by the projection lens was described.

However, according to another embodiment of the present invention, reflected light that enters from reflecting planes of optical devices to a reflective liquid crystal device can be removed by a similar mechanism, in a case where the optical devices having a reflecting plane, such as a filter, are disposed instead of the projection lens.

Therefore, occurrence of the ghost image generated by the reflected light can be prevented, and it is advantageous in improving image quality.

Furthermore, the above embodiments disclose a configuration using the splitting prism taking advantage of total reflection as the image splitter 24.

However, the image splitter 24 is not limited to the splitting prism, and it should be appreciated that the image splitter 24 may be configured with, for example, a combination of front surface reflecting mirrors having at least one of a dielectric film and a metallic thin film formed thereon.

When the image splitter 24 is configured with the combination of the front surface reflecting mirrors, the amount of the phase difference generated by the image splitter 24 is different from the amount of the phase difference in a case of configuring the image splitter 24 with the splitting prism. Therefore, the amount to be corrected by the phase difference corrector may be determined depending on the phase difference characteristics of each front surface reflecting mirror.

In this regard, if the phase difference can be controlled by the film formed on the front surface reflecting mirror, the film can be the phase difference corrector.

Moreover, the above embodiments were explained assuming that the 3D image is projected by the projection display apparatus 10 forming again and superimposing the left and the right real images split by the image splitter 24 onto the screen S using the first and the second projection lenses 26 and 28.

However, the embodiments are applicable if the projection display apparatus 10 projects the 3D image by forming the left and the right real images split by the image splitter 24 in parallel onto the screen S using the first and the second projection lenses 26 and 28 without superimposing them.

In this case, the image formed again on the screen S is configured by placing the real images split by the image splitter 24 and formed by the first and the second projection lenses 26 and 28 next to one another.

Furthermore, in this case, a horizontally long screen is formed by projecting the two images, on the screen S, arranged on the left and the right, and a longitudinally long screen is formed by projecting the two images, on the screen S, arranged on the top and the bottom.

The present application contains subject matter related to that disclosed in Japanese Priority Patent Application JP 2009-021564 filed in the Japan Patent Office on Feb. 2, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A projection display apparatus comprising:
    a light source configured to emit light;
    at least one reflective liquid crystal device configured to generate an image by modulating a polarization of the light emitted from the light source and reflecting the light;
    an imaging lens configured to form a real image of the image generated by the reflective liquid crystal device;
    a quarter-wave plate disposed between the reflective liquid crystal device and the imaging lens;
    means for splitting image configured to include at least one reflecting plane and spatially split the real image into at least two split real images by reflecting the real image on the reflecting plane;
    at least two projection lenses configured to form the split real images again on a screen; and
    means for correcting phase difference configured to correct a phase difference between a p-polarized light and an s-polarized light generated by the reflecting plane.

2. The projection display apparatus according to claim 1, wherein the means for correcting phase difference is disposed either between the imaging lens and the means for splitting image or between the means for splitting image and the projection lenses.

3. The projection display apparatus according to claim 1, wherein the means for correcting phase difference is an optical thin film provided on the reflecting plane.

4. The projection display apparatus according to claim 1, wherein the means for correcting phase difference is an optical crystal provided on the reflecting plane.

5. The projection display apparatus according to claim 1, wherein the means for correcting phase difference is a wave plate.

6. The projection display apparatus according to claim 1, wherein:
    the means for splitting image includes an image-splitting reflecting plane intersecting an incident optical axis to the means for splitting image as the reflecting plane;
    the means for correcting phase difference is disposed between the means for splitting image and the projection lenses;
    the means for correcting phase difference includes a phase-difference-correcting reflecting plane extending along a plane intersecting the image-splitting reflecting plane; and
    the image-splitting reflecting plane and the phase-difference-correcting reflecting plane are disposed so that the incident optical axis is at right angles to a plane including an incident optical axis to the means for correcting phase difference and an output optical axis from the means for correcting phase difference.

7. The projection display apparatus according to claim 1, wherein an image reformed on the screen is an image formed from the real images that are split by the means for splitting image, reformed by the projection lenses, and superimposed.

8. The projection display apparatus according to claim 1, wherein an image formed again on the screen is configured by placing real images split by the means for splitting image and formed by the projection lenses next to one another.

9. A projection display apparatus comprising:
    a light source configured to emit light;
    at least one reflective liquid crystal device configured to generate an image by modulating a polarization of the light emitted from the light source and reflecting the light;
    an imaging lens configured to form a real image of the image generated by the reflective liquid crystal device;
    a quarter-wave plate disposed between the reflective liquid crystal device and the imaging lens;
    an image splitter configured to include at least one reflecting plane and spatially split the real image into at least two split real images by reflecting the real image on the reflecting plane;
    at least two projection lenses configured to form the split real images again on a screen; and
    a phase difference corrector configured to correct a phase difference between a p-polarized light and an s-polarized light generated by the reflecting plane.

* * * * *